United States Patent
Lawbaugh

(10) Patent No.: US 9,519,561 B2
(45) Date of Patent: Dec. 13, 2016

(54) METHOD AND SYSTEM FOR CONFIGURATION-CONTROLLED INSTRUMENTATION OF APPLICATION PROGRAMS

(75) Inventor: Paul Claudell Lawbaugh, Hillsboro, OR (US)

(73) Assignee: Webtrends Inc., Portland, OR (US)

( * ) Notice: Subject to any disclaimer, the term of this patent is extended or adjusted under 35 U.S.C. 154(b) by 1242 days.

(21) Appl. No.: 13/088,290

(22) Filed: Apr. 15, 2011

(65) Prior Publication Data

US 2012/0265824 A1 Oct. 18, 2012

(51) Int. Cl.
*G06F 11/30* (2006.01)
*G06F 11/36* (2006.01)

(52) U.S. Cl.
CPC ....... *G06F 11/3089* (2013.01); *G06F 11/3664* (2013.01)

(58) Field of Classification Search
CPC ............ G06F 11/3612; G06F 2221/033; G06F 9/5088; G06F 2201/87; G06F 2201/88; H04L 67/22
USPC ................ 709/202, 217, 223, 224, 229, 250
See application file for complete search history.

(56) References Cited

U.S. PATENT DOCUMENTS

| | | | | |
|---|---|---|---|---|
| 5,155,693 A * | 10/1992 | Altmayer | ................. | G07C 3/00 340/679 |
| 7,047,521 B2 * | 5/2006 | Bunnell | ............. | G06F 11/3466 714/E11.2 |
| 7,739,666 B2 | 6/2010 | Zhu et al. | | |
| 8,195,661 B2 * | 6/2012 | Kalavade | ....................... | 707/736 |
| 8,251,704 B2 * | 8/2012 | Woolf et al. | ................... | 434/322 |
| 8,255,932 B1 * | 8/2012 | Clemm | ..................... | G06F 8/54 709/230 |
| 8,307,337 B2 * | 11/2012 | Chamieh et al. | ............ | 717/113 |
| 8,347,392 B2 * | 1/2013 | Chess et al. | .................... | 726/25 |
| 9,118,679 B2 * | 8/2015 | McClain | .............. | F16L 23/036 |
| 9,268,619 B2 * | 2/2016 | Rivkin | ..................... | G06F 9/541 |
| 2004/0068560 A1 * | 4/2004 | Oulu et al. | ..................... | 709/224 |
| 2004/0215762 A1 * | 10/2004 | Oulu et al. | ..................... | 709/223 |
| 2005/0125784 A1 * | 6/2005 | Yang | .................. | G06F 11/3419 717/158 |
| 2006/0128373 A1 * | 6/2006 | Cochrane | ................ | H04M 1/24 455/424 |
| 2009/0061844 A1 | 3/2009 | Tiernan | | |
| 2009/0271514 A1 * | 10/2009 | Thomas et al. | ............... | 709/224 |
| 2010/0262646 A1 | 10/2010 | Lee et al. | | |
| 2010/0325371 A1 * | 12/2010 | Jagadish et al. | .............. | 711/150 |
| 2010/0325588 A1 * | 12/2010 | Reddy et al. | ................. | 715/853 |
| 2010/0332550 A1 * | 12/2010 | Ainslie | ........................ | 707/802 |

(Continued)

*Primary Examiner* — Sargon Nano
(74) *Attorney, Agent, or Firm* — Olympic Patent Works PLLC

(57) ABSTRACT

Embodiments of the present invention provide tools and facilities for instrumentation of application programs, including application programs that execute on mobile-electronics devices, including web browsers. The application-program and mobile-electronics-device environment is a superset of the web-analytics problem domain and provides many new opportunities and challenges for instrumentation-based data collection and data analysis. Certain embodiments of the present invention provide configuration-controlled embedded instrumentation that allows fine-granularity control of instrumentation operation by remote data-collection servers.

18 Claims, 31 Drawing Sheets

(56) References Cited

U.S. PATENT DOCUMENTS

2014/0032694 A1* 1/2014 Cohn .................. G06F 11/3072
709/207

* cited by examiner

```
312 302 308  <!DOCTYPE html PUBLIC "-//W3C//DTD XHTML 1.0 Transitional//EN" "http://www.w3.org/TR/xhtml1/DTD/xhtml-transitional.dtd">
             <html xmlns="http://www.w3.org/1999/xhtml">
             <head> — 304
             <meta http-equiv="Content-Type" content="text/html ; charset=UTF-8" />
             <title>Demo Web Site Confirmation | Widemile Optimization Platform</title>
             <style type="text/css">
             Body { margin: 0; padding: 0; background: #b3b3b3; text-align:center; } img{ border:none; }
             #container{ background: #fff url (images/demo_site_bg.jpg) no-repeat 0 0; margin:36px auto;/*center*/height:660px; width:952px; }
             #header{ padding:24px 24px 0 24px; }
             #left{ float:left; width:369px; margin:36px 0px 0px 24px; }
             #right{ float:right; width:459px; margin:36px 24px 0px 0px; } * > #left {margin:36px 0px 48px;  }/*reset ie6 double margin bug*/
             #button{ margin:36px 0px; }                                   * > #right {margin:36px 48px 0px 0px; }/*reset ie6 double margin bug*/
             </style>
             <!--insert: Widemile Optimization Platform Client Library -->
             <script type="text/javascript" src="http://www.widemile.com/js/wm_capi.js"></script>
             </head> — 310
             <body>
             <!-- insert: Widemile conversion tracking Code -->
             <script type="text/javascript"> WM.setup();</script>  — 314
             <div id="main_ext">
               <div id="container">
                 <div id="header">
                 <div id="headliner">
                   <img src="images/demo_site_confirmation_hd.jpg" alt="Confirmation" />
                 </div>
                 <div id="left">
                   <div id="hero">
                     <img src="images/demo_site_confirmration_hs.jpg" alt="" />
                   </div>
                 </div>
                 <div id="right">
                   <div id="offer">
                     <img src="images/demo_site_confirmation_offer.jpg" alt="Thank You" />
                   </div>
                 </div>
                 <div id="button">
                   <a href="index.htm">
                     <img src="images/demo_site_confirmation_btn.jpg" alt="Home Button" />
                   </a>
                 </div>
               </div>
             </div>
             </div> — 316
             </body>  306
             </html> — 318
                      320
```

FIG. 3

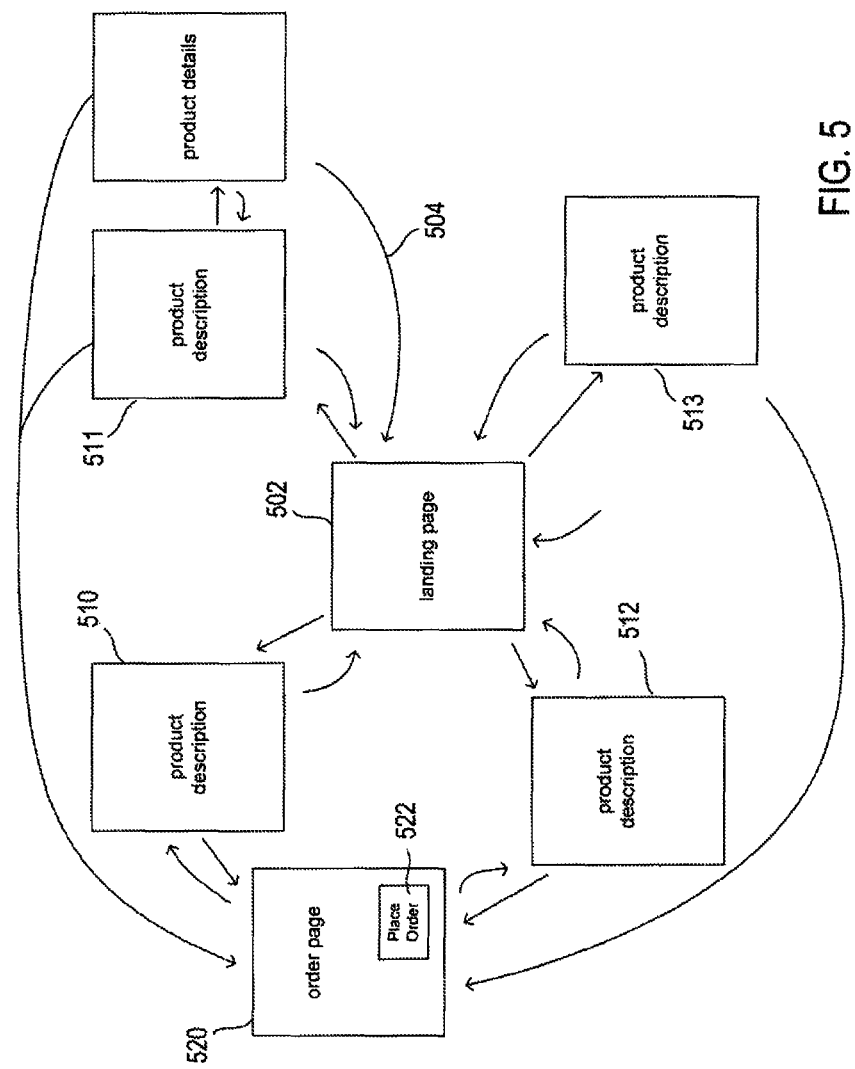

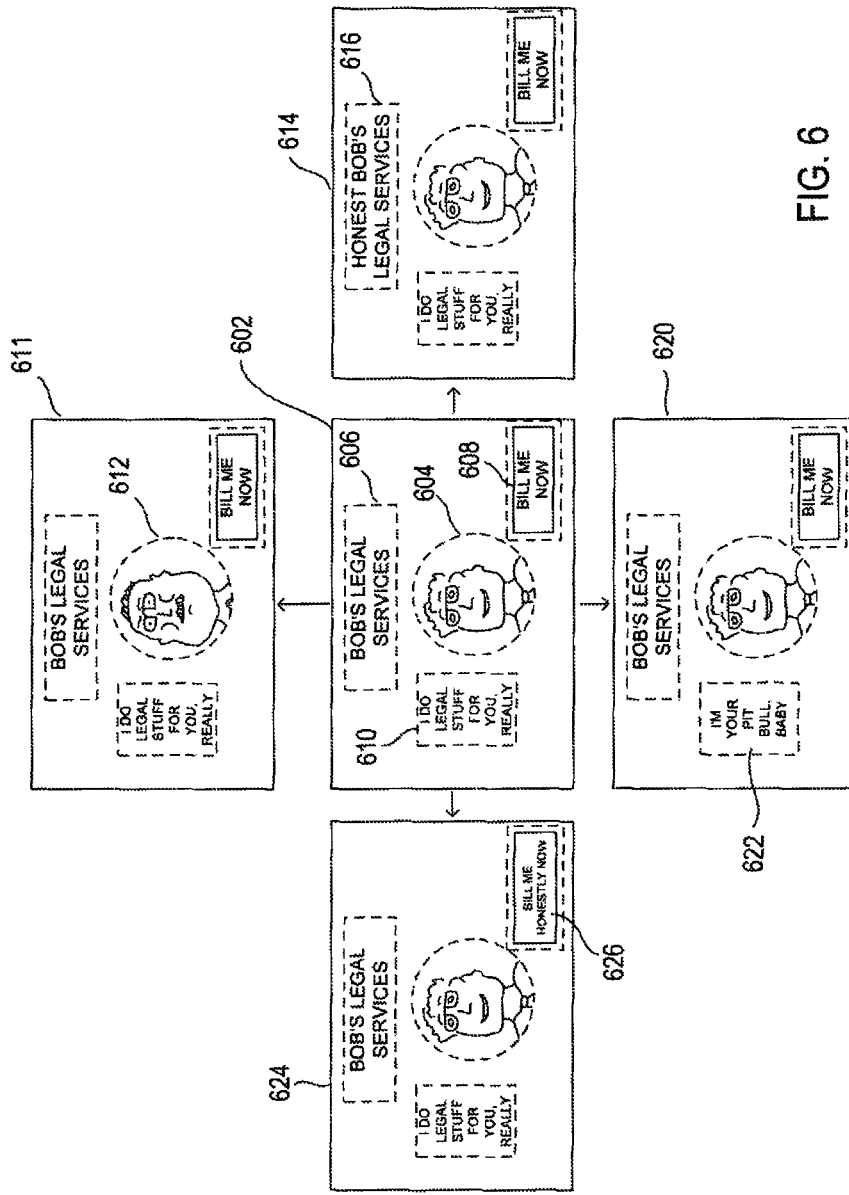

|  | factor 1 | factor 2 | factor 3 | factor 4 |
|---|---|---|---|---|
| level 1 | I DO LEGAL STUFF FOR YOU, REALLY | BOB'S LEGAL SERVICES | | BILL ME NOW |
| level 2 | I'M YOUR PIT BULL, BABY | HONEST BOB'S LEGAL SERVICES | | BILL ME HONESTLY NOW |
| level 3 | HEY, POINT ME AND I'LL BITE | CHECKS-IN-THE-MAIL LEGAL SERVICES | | TAKE MY DOUGH |
| level 4 | I'M YOUR GREAT WHITE SHARK | PREDATOR FOR HIRE | | BILL ME NOW AND FOREVER |
| level 5 | CONTRACTS, LICENSES, NON-DISCLOSURE, LITIGATION | | | BILL ME SHAMELESSLY |
| level 6 | I DO ANYTHING FOR MONEY | | | |

FIG. 7

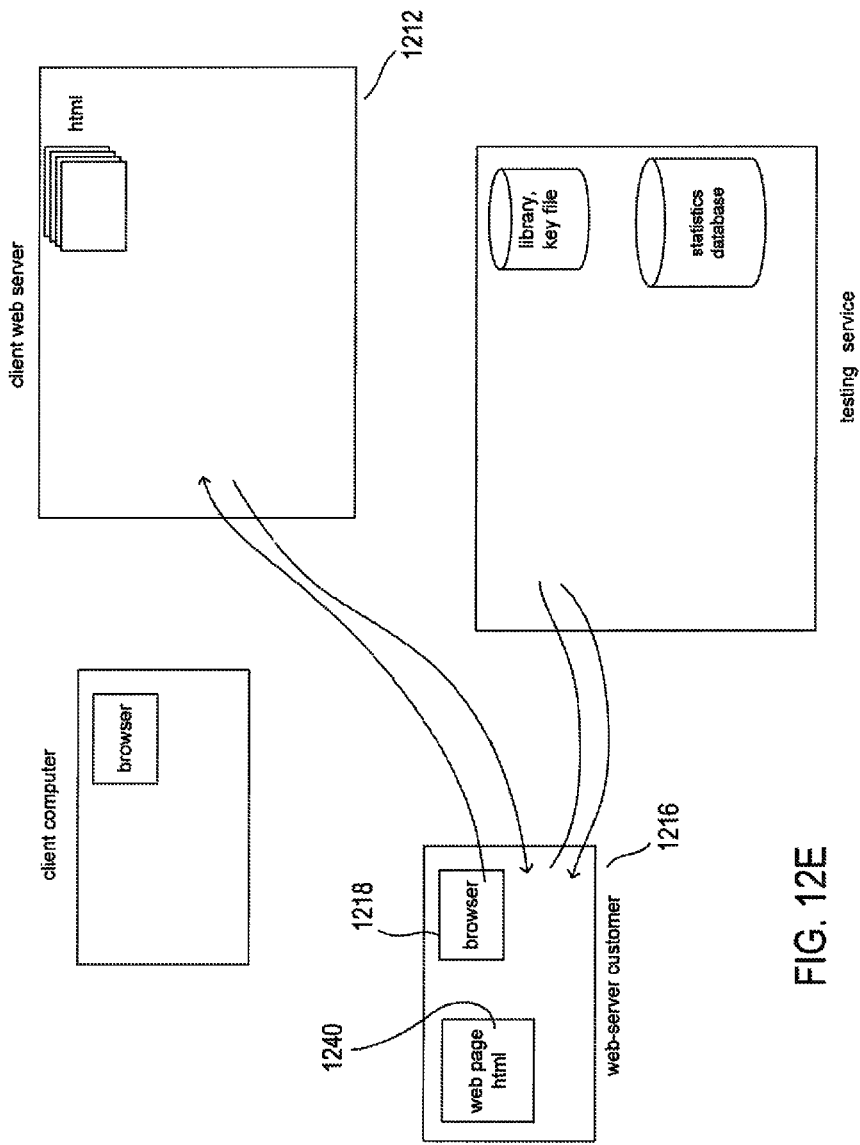

```xml
<?xml version="1.0" encoding="utf-8"?>
<resources>
  <string name="wt_dc_app_category">Entertainment</string>
  <!-- Name of your application. -->
  <string name="wt_dc_app_name">Ticketmaster</string>
  <!-- Publisher of your application (vendor or developer name). -->
  <string name="wt_dc_app_publisher">RIM</string>
  <!-- Version of your application. -->
  <string name="wt_dc_app_version">1.0.34</string>
  <!-- Percent of battery life remaining when event send is paused. This is the recommended setting for
Webtrends data collection. -->
  <string name="wt_dc_charge_threshold_minimum">30</string>

<!-- Supply a unique ID in the format dcsxxxxxxxxxxxxxxxxxxxxxxx_xxxx that is associated with a Webtrends
data source. This ID identifies your data to the Webtrends data collection server. If you don't have a dcsid,
contact your Webtrends administrator.-->
  <string name="wt_dc_dcsid">dcsr2m65wvz5bdnsdx1oqi0a6_6b5y</string>
  <!-- Visitor ID source. Specify the source of the ID you will use for tracking unique visitors. For more
information, see the documentation at developer.webtrends.com.-->
  <string name="wt_dc_id_method">webtrends_id</string>
  <!-- Set this value to "true" if you want Webtrends to track the mobile device location using GPS or cell phone
tower. -->
  <string name="wt_dc_location_enabled">false</string>
  <!-- Set this value to "oncepersession" if battery drain is a concern. Setting this value to "continuous" updates
location information throughout a user session.-->
  <string name="wt_dc_location_method">oncepersession</string>
  <!-- Set this value to "true" if you want the Data Collection API to send you debugging information about your
Webtrends application tracking. You should also set wt_dc_debug to "true" if you enable this setting.-->
  <string name="wt_dc_dcsverbose">false</string>
  <!-- Set this value to "true" if you want to enable application logging. -->
  <string name="wt_dc_debug">false</string>
  <!-- Set this value to "false" if you want to disable the Webtrends library. -->
  <string name="wt_dc_enabled">true</string>
  <!-- Number of times to retry sending an event in response to send error. This is the recommended setting
for Webtrends data collection. -->
  <string name="wt_dc_event_retry_maximum">5</string>
  <!-- Maximum number of events stored in event queue. This is the recommended setting for Webtrends data
collection. -->
  <string name="wt_dc_event_table_size_maximum">10000</string>
  <!-- Set this value to "true" if you want the Webtrends library to request PERMISSION_INTERNET,
PERMISSION_CROSS_APPLICATION_COMMUNICATION, PERMISSION_SECURITY_DATA from the permission
database. Otherwise you must manage permissions. -->
  <string name="wt_dc_request_permission">false</string>
  <!-- Session expiration in minutes. This is the recommended setting for Webtrends data collection. -->
  <string name="wt_dc_session_maximum">480</string>
  <!-- Session timeout in minutes. This is the recommended setting for Webtrends data collection. -->
  <string name="wt_dc_session_timeout">30</string>
  <!-- Timezone of datasource in number of hours offset from GMT. -->
  <string name="wt_dc_timezone">-6</string>
  <!-- Data Collection API base URL. This URL is static and should not be changed. -->
  <string name="wt_dc_url">https://dc.webtrends.com/v1</string>
</resources>
```

FIG. 22

METHOD AND SYSTEM FOR CONFIGURATION-CONTROLLED INSTRUMENTATION OF APPLICATION PROGRAMS

TECHNICAL FIELD

The present invention is related to automated data analysis and Internet-based experimentation and, in particular, to a method and system for instrumenting application programs.

BACKGROUND

With the advent of the Internet and Internet-based retailing, a new web-analytics industry has emerged that provides marketing analysis and other types of analyses related to Internet-based retailing and other Internet-based activities. In one type of web-analysis system, particular web pages deployed by an Internet-based client are instrumented so that, when remote users access and interact with the deployed web pages, a web-analysis system receives information from the users' computers that allows the web-analysis system to collect a raw-data set describing user interaction with instrumented deployed web pages. Complex, sophisticated analysis programs within the data-analysis system can then process the raw data to return results to the Internet-based client.

Currently, a large new retailing industry is emerging with the rapid adoption of application-program-based mobile electronics devices, including cell phones, electronic pads, and a wide variety of additional devices ranging from traditional personal computers to portable media players and communications devices. Whereas web analytics is primarily concerned with collecting data from instrument web pages, the new retailing industry includes retailing of application programs as well as retailing through user interfaces provided by application programs in addition to web-browser-based retailing and services. The rapidly evolving new electronics environments provide both opportunities and challenges for web-analytics-like testing and monitoring services for monitoring and analyzing deployed application programs.

SUMMARY OF THE INVENTION

Embodiments of the present invention provide tools and facilities for instrumentation of application programs, including application programs that execute on mobile-electronics devices, including web browsers. The application-program and mobile-electronics-device environment is a superset of the web-analytics problem domain and provides many new opportunities and challenges for instrumentation-based data collection and data analysis. Certain embodiments of the present invention provide configuration-controlled embedded instrumentation that allows fine-granularity control of instrumentation operation by remote data-collection servers.

BRIEF DESCRIPTION OF THE DRAWINGS

FIG. 3 shows the contents of an HTML file that encodes the exemplary web page shown in FIG. 2 and that includes simple modifications to facilitate data collection.

FIG. 5 illustrates a simple website comprising seven web pages.

FIGS. 6-7 illustrate factors, factor levels, and test design.

FIGS. 12A-H illustrate a general method and system for web-site testing.

FIG. 22 provides an example XML configuration file used in one embodiment of the present invention.

DETAILED DESCRIPTION

The present invention is directed to providing tools and facilities for instrumentation of application programs, including application programs that execute on mobile-electronics devices such as web browsers. The application-program and mobile-electronics-device environment is a superset of the web-analytics problem domain and provides many new opportunities and challenges for instrumentation-based data collection and data analysis. In a first subsection below, an example web-analysis system is described, in detail, to provide background and context for describing instrumentation in the application-program and mobile-electronics-device environment. In a second subsection, embodiments of the present invention are disclosed including embodiments directed to configurable instrumentation of application programs.

Figure 1:
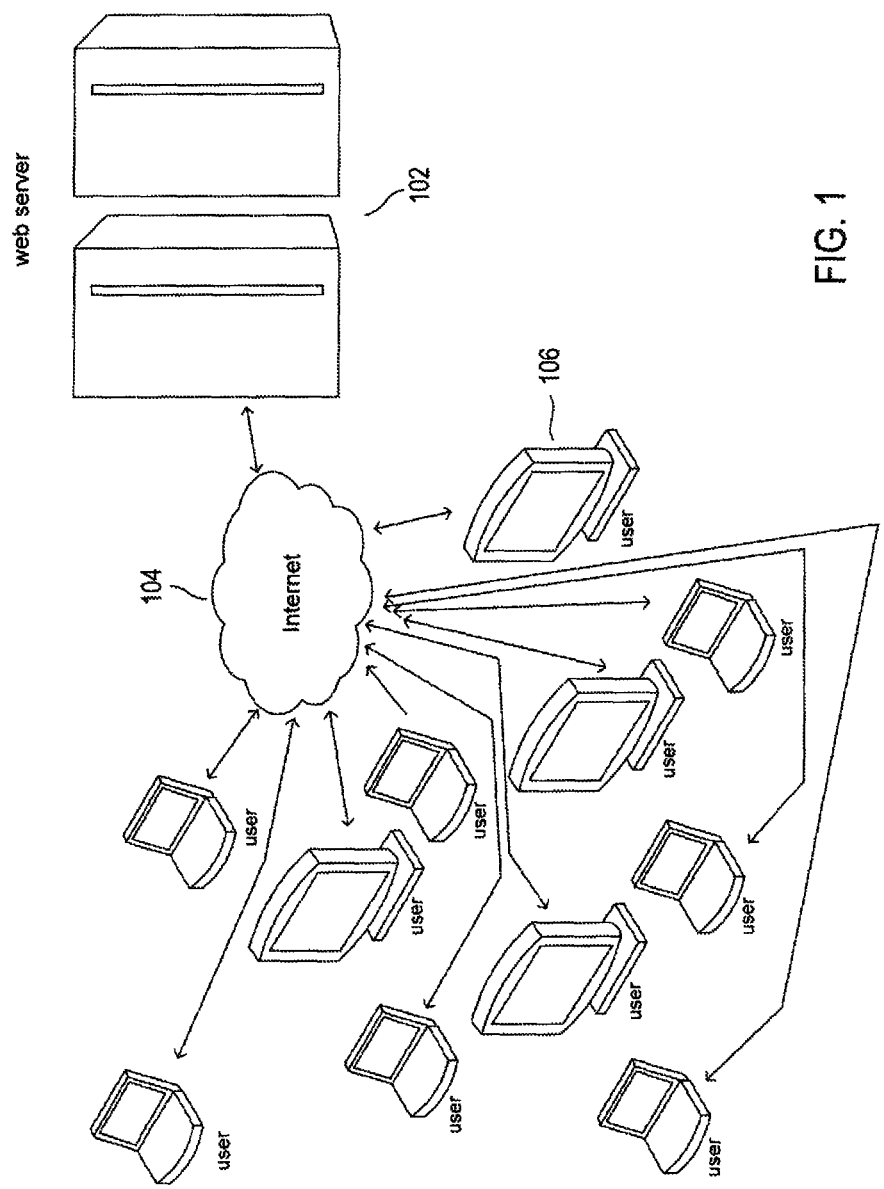
FIG. 1 provides a context for discussion of method and system embodiments of the present invention.

Example Web-Analysis System that Provides a Context for Describing Application-Program-Instrumentation Embodiments of the Present Invention FIG. 1 provides a context for discussion of method and system embodiments of the present invention. In FIG. 1, a server 102, comprising one or more servers and/or other types of computer systems, transmits HTML-encoded web pages through the Internet 104 to a large number of user or customer computers, including user computer 106. As discussed above, the web server may be owned and operated by an Internet retailing organization, an information-distribution system, a social-networking system, or another type Internet-based transactional or content-distribution system. In general, the web server runs continuously at all times during the day and night providing HTML-encoded web pages and, usually, additional types of information and services, including downloads of executable code, scripts, and other such information for specific types of web-based applications.

Figure 2:
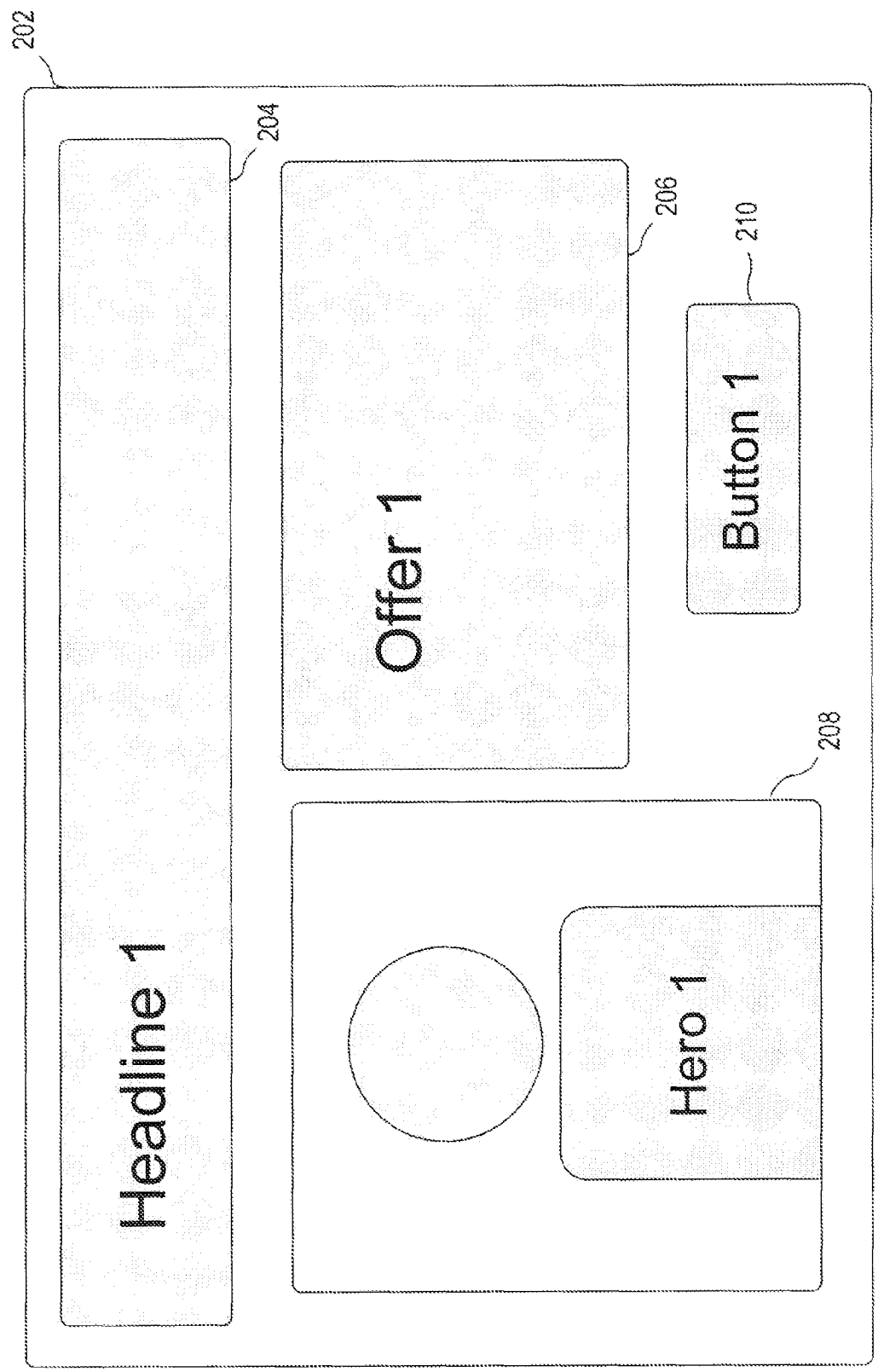
FIG. 2 shows a simple exemplary web page.

FIG. 2 shows a simple, exemplary web page. A web page is described by an HTML file, discussed below with reference to FIG. 3, which is executed by a web browser on a computer in order to generate a web page 202 that is displayed to a user on a display device. The example web page 202 includes a headline graphic 204, an offer graphic 206, a hero graphic 208, and a button graphic 210. The exemplary web page is subsequently discussed in the context of tests and experiments in which altered versions of the web page are provided to users of the web server that serves the web page in order to test the effects of modifications to the web page.

FIG. 3 shows the contents of an HTML file that encodes the exemplary web page shown in FIG. 2 and that includes simple modifications to facilitate data collection. The modifications, used to virtually incorporate a testing service into a website are discussed below, with reference to FIG. 14.

A complete discussion of HTML is beyond the scope of the current discussion. In FIG. 3, portions of the HTML file are correlated with features in the displayed web page shown in FIG. 2. In addition, general features of HTML are illustrated in FIG. 3. HTML is hierarchical, in nature. In FIG. 3, double-headed arrows, such as double-headed arrow 302, have been drawn to the left of the HTML code in order to illustrate tags and tag scoping within the HTML file. In general, HTML statements are delimited by a pair of tag, and are hierarchically organized by scope. For example, an outermost statement begins with a first tag of a tag pair that begins with the text "<html xmlns=" (304 in FIG. 3) and ends with a last tag of the tag pair that begins with the text "</HTML" (306 in FIG. 3). The scope of outermost statement encompasses the entire HTML code. The double-headed arrow 302 at the left of the HTML code, which represents the scope of this statement spans the entire HTML file. A second-level that begins with the first tag of a tag pair "<head>" 308 and ends with the last tag of the tag pair "</head>" 310 spans a first portion of the HTML file, as indicated by double-headed arrow 312, and a second statement bounded by the first and last tags of a tag pair "<body>" 314 and "</body>" 316 span a second portion of the HTML file, indicated by double-headed arrow 318. By examining the tags within the exemplary HTML file, shown in FIG. 3, and the double-headed indications of the scope of tag-delimited statements, the hierarchical nature of HTML can be readily appreciated.

Figure 4:
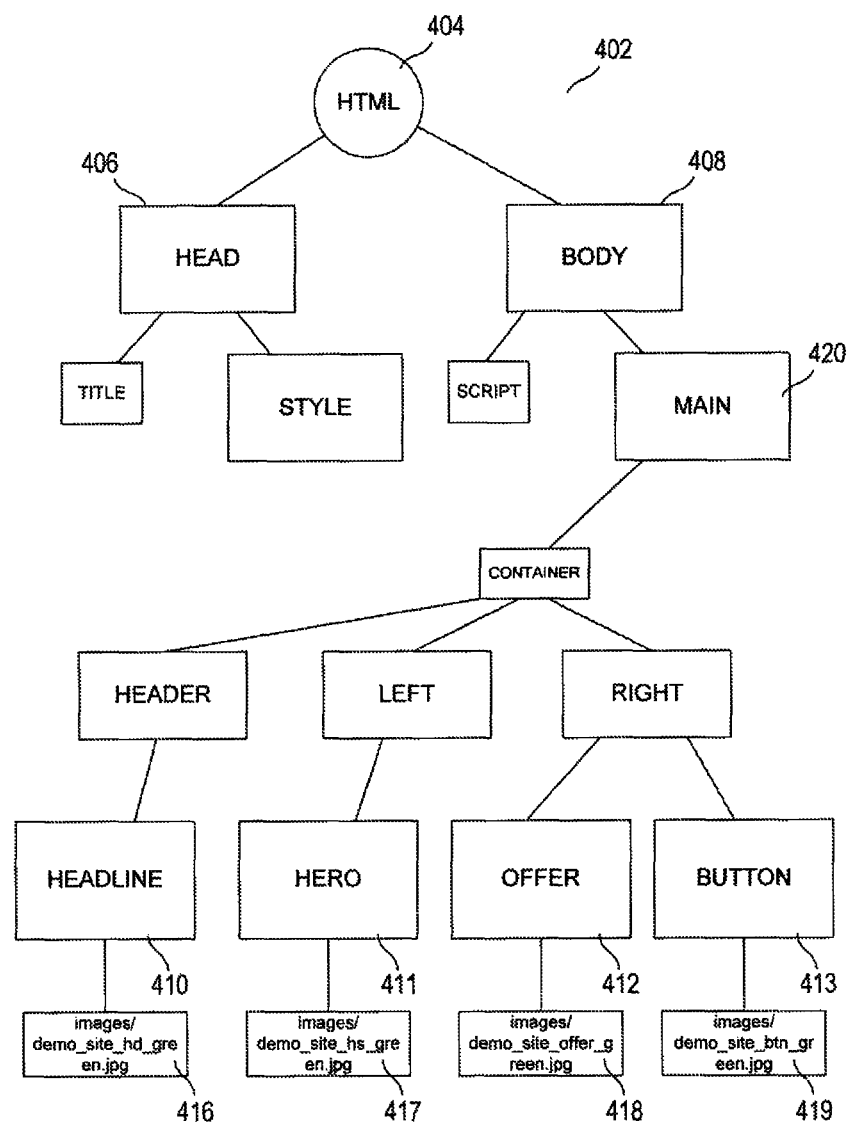
FIG. 4 provides a tree-like representation of the contents of the exemplary HTML file shown in FIG. 3.

FIG. 4 provides a tree-like representation of the contents of the exemplary HTML file shown in FIG. 3. The tree 402 shown in FIG. 4 is constructed from the double-headed arrows that annotate the HTML code, in FIG. 3, that span the scopes tag-delimited statements in the exemplary HTML file. For example, the root node 404 corresponds to double-headed arrow 302, and the second level "head" 406 and "body" 408 nodes correspond to double-headed arrows 312 and 318 in FIG. 3, respectively. Note that, at the very bottom of the tree representation of the HTML file, shown in FIG. 4, the four leaf nodes 416-419 represent the four features 204, 206, 208 and 210 of the displayed web page encoded by the exemplary HTML file, shown in FIG. 2. Each of these nodes is essentially a reference to an image file that contains a jpeg image of the corresponding web-page feature. The head statement, represented by node 406 in FIG. 4, includes formatting information, references to highest-level resource-location directories, and a great deal of additional information that is used by a browser to plan construction of a displayed web page. The body statement represented by node 408 in FIG. 4, includes references to image files, text, and other features that are rendered by the browser into displayed features of the web page. Intermediate nodes include identifiers, particular metadata information, and references to scripts that are downloaded and run by the web browser during web-page rendering and/or display.

As a specific example node 416, a direct and only descendant of the node labeled "headline" 410 in FIG. 4, corresponds to the headline feature 204 displayed in the exemplary web page shown in FIG. 2. This node also corresponds to double-headed arrow 320 in FIG. 3. The statement "<img src="images/demo_site_hd_green.jpg" indicates that the displayed object is encoded as a jpeg image "demo_site_offer_green.jpg" that can be found in a file-system sub-directory "images."

In order to transform an HTML file into a displayed web page, a web browser constructs a tree-like binary-encoded data object referred to as a "document object model" ("DOM."). The exact contents and structure of a DOM is beyond the scope of the present invention. However, certain web-analysis methods and systems rely on standardized DOM editing interfaces that provide routines to identify nodes and subtrees within a DOM and to edit and modify identified nodes and subtrees. Once a browser creates a DOM from the exemplary HTML file shown in FIG. 3, DOM-editing routines can be used to locate the node in the DOM corresponding to the node "headline" 410 in FIG. 4 and replace or modify that node to reference a different image. Following modification, the web browser would then display a modified web page in which the headline image 204 in FIG. 2 is replaced by a different image. To effect more dramatic changes, an entire subtree of a DOM, such as the subtree rooted by a node corresponding to the node "right" 420, can be removed or replaced, to change groups of display features. While the discussed web-analysis system uses DOM tree modification techniques, other types of modification techniques provided by interfaces to other types of binary representations of web-pages may be used. The DOM is only one of many possible binary representations that may be constructed and employed by web browsers.

Another feature of the exemplary HTML file shown in FIG. 3 is that the various features displayed in FIG. 2 are, in HTML, wrapped by tag-delimited identifiers. For example, the "wm_headline" tag indicated by double-headed arrow 320 and by node 410 in FIG. 4 is an identifier for the headline-image-reference statement 322. Alphanumeric identifiers, such as the identifier "wm_headline," are introduced into an HTML file in order to give easy-to-understand and easy-to-use labels or handles for various objects, particularly objects that correspond to displayed features in a web page. Although objects can be easily identified in this manner, other methods for identifying objects within an HTML file, as well as corresponding nodes of DOM trees and other such binary representations of a rendered page, can be used to reference display objects.

FIG. 5 illustrates a simple web site comprising seven web pages. Each web page, such as web page 502, is represented by a rectangle in FIG. 5. Curved arrows, such as curved arrow 504, indicate navigational paths between the web pages. When accessing the website illustrated in FIG. 5, a user generally first accesses a landing page 502 as a result of clicking a link provided by another web page, such as a web page provided by a search engine or provided in a list of bookmarked links by a web browser. The landing page is often, but not necessarily, a home page for the website. A home page is a central portal for access to all of the remaining web pages in the web site. In general, a user navigates through the web site by clicking on displayed links embedded in web pages. For example, the web site illustrated in FIG. 5 is a retailing web site. The landing page provides links to four different pages 510-513 that provide product descriptions for four different products. A user, after viewing the landing page 502, may click a link in order to navigate to a display of a product-description page 510. In the exemplary web site shown in FIG. 5, a user may subsequently navigate from a product-description page or product-details page to a central order page 520 that contains a button or feature 522 to which the user can input a mouse click in order to order one or more products. In certain cases, web sites comprises a single page and, in other cases, a web site comprises tens to hundreds or more pages linked together in a network-like graph describing various navigational paths between web pages.

An example application of web-site testing would be to monitor user access of the web pages shown in FIG. 5 in order to attempt to determine how often users end up navigating to the order page and clicking the place-order button 522. One might then modify one or more of the pages, and again monitor users access to the pages and subsequent input to the place-order button 522. In this way, by testing collective user response to various alternative web pages, web-site developers and managers may be able to determine an optimal set of web pages that provides the highest ratio of inputs to the place-order button 522 to user accesses of the landing page 502. In testing parlance, clicking the place-order button 522, in the example web site shown in FIG. 5, is considered to be a conversion event. One possible goal of optimizing the web site is to increase the percentage of users clicking on the place-order button 522 after initially accessing the landing page 502. However, conversion events may be arbitrarily defined, and there may be multiple conversion events for a particular web site. Optimization of a web site may also involve multiple, often at least partially contradictory, goals. One goal may be to increase the number of accesses to any page other than the landing page by users who have initially accessed the landing page. Another goal may be to increase total accesses to the landing page, regardless of subsequent page accesses by users accessing the landing page. Yet another goal may be to obtain maximum possible conversion rates, even at the expense of decreasing the overall rate of page accesses.

FIGS. 6-7 illustrate factor, factor levels, and test design. In FIG. 6, an initial prototype web page 602 is shown. A web-site owner or developer may decide to systematically alter the prototype web page in order to test the effects of the systematic alterations so that alterations that appear to maximize goals can be made to the web page in order to optimize the web page. The prototype web page includes a portrait image 604, a title 606, a user-input feature 608, and an informational message 610. A systematic tester may decide to alter each of these web-page-features, one-at-a-time, in order to determine the effects of the altered features on measured user response. For the web page shown in FIG. 6, the measured user response or conversion event would likely be user input to the user-input feature 608. As shown in FIG. 6, a tester may devise a first test web page 611 in which the prototype image 604 is replaced with a different image 612. The tester may devise a second test page 614 in which the title feature 606 is replaced with a different title feature 616. Similarly, the tester may devise a third test page 620 in which the informational messaged 610 of the prototype web page is replaced with a different informational message 622. Finally, the tester may create a fourth test web page 624 in which the user-input feature 608 of the prototype web page is replaced with a differently labeled user-input feature 626. The systematic tester may change a single feature in each of the four test pages, in order to judge the effect of changing that feature in isolation from any other changes to the web page that might be contemplated. However, the strictly one-feature-change-at-a-time method would fail to provide data for the effects of various combinations of changes, such as changing both the headline and a portrait and, moreover would require significant developer time and effort.

FIG. 7 illustrates a related approach to the testing approach discussed with reference to FIG. 6. In FIG. 7, the tester has prepared a table of factors and factor levels. Each factor in the table is represented by a column, such as the first column 702 corresponding to factor 1. Each factor is a feature, or group of related features, on a displayed web page that the tester wishes to alter in order to determine whether or not to alter the feature in the web page with respect to one or more optimization goals. The various alternatives for each factor are referred to as levels. Thus, for example, factor 1, represented in the table by column 702, corresponds to the information message (610 in FIG. 6), for which the tester has devised six different alternatives, each corresponding to one of six different levels associated with that factor. The tester has devised four alternatives for factor 2, the title feature (606 in FIG. 6), five alternatives for factor 3, the portrait feature (604 in FIG. 6), and five alternatives for the fourth factor, the user-input feature (608 in FIG. 6). Then, having specified the factors, or web-page features to be altered, and the various different alternatives for each feature, the tester might try generating all possible test pages corresponding to all possible combinations of level values for the factors in order to test the different alternative web pages to determine an optimal set of four levels corresponding to optimal alternatives for the four factors. Unfortunately, an exhaustive, combinatorial test, in most cases, is not feasible. Even for the very simple example of FIGS. 6 and 7, there are 1260 different alternative pages, including the prototype page, which can be constructed by varying between one and four factors according to the variations or levels in the table provided in FIG. 7. In general, for the statistics collected from testing to have significance, a sufficient number of tests need to be conducted so each of the different test pages is displayed a relatively large number of times during the test. In the example of FIGS. 6 and 7, each different alternative web page among the 1260 possible alternative web pages may need to be displayed hundreds or thousands of times to users in order to accumulate sufficient test data to make valid statistics-based judgments. In many cases, the number of factors and number of levels for each factor may be far larger than in the simple example shown in FIGS. 6 and 7.

The variations of factors, or levels, may include changes in content, display size, display color, object position in the displayed image, or many other different types of changes. Again, as discussed above, a factor may include multiple display features.

Because of the general infeasibility of full, exhaustive, and combinatorial testing of all possible web-page variations, certain web-analysis methods and systems use an experimental-design method referred to as "the orthogonal-array method." This method devises a non-exhaustive test strategy that nonetheless gathers sufficient well-distributed test data in order to make reasonable inferences with regard to the effects of altering the factors in all possible ways. In essence, the orthogonal-array method involves devising a sparse sampling of all possible variations of the web page that provides information about the various dependencies between the different levels of the different features. The orthogonal-array method involves specifying the factors and specifying the levels for each factor of a particular test run, and then, based on the factors and levels for each factor to be tested in a particular test run, devises a set of alternative web pages, by varying the specified factors according to the specified levels, that provide a good basis for collecting statistics for the features to be tested. The orthogonal-array method is well known in testing and statistics. Many additional types of test-design methods may also be used. Whatever test-design technique is employed, each test run defined by clients is associated with a test design that controls generation and distribution of experiments or modified web pages.

Figure 8:
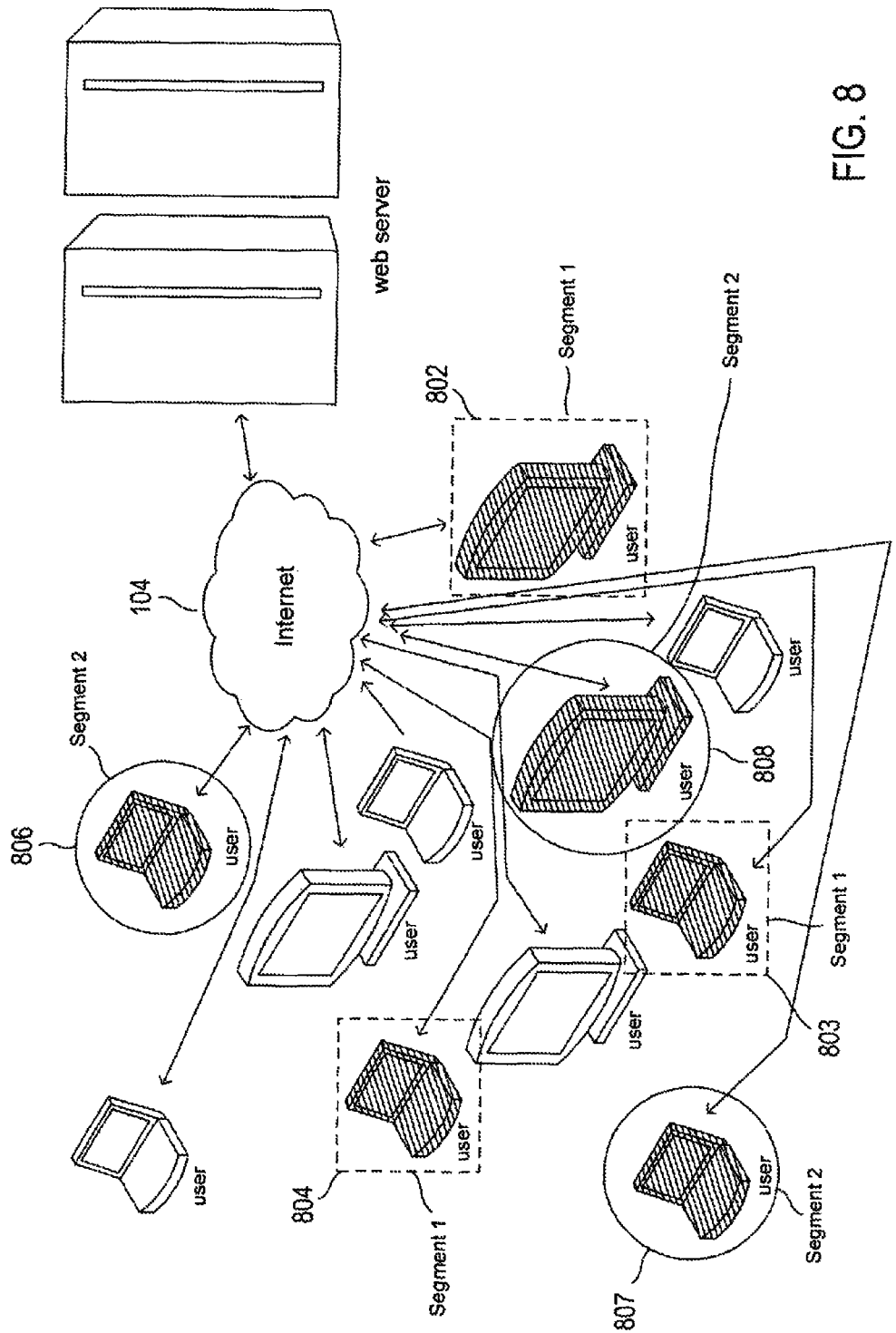
FIG. 8 illustrates the concept of segments in testing of web pages.

FIG. 8 illustrates the concept of segments in testing of web pages. FIG. 8 shows the web server and users of the web server using the same illustration conventions as used in FIG. 1. However, in FIG. 8, a first set of three users 802-804 are marked as belonging to a first segment, segment 1, and a second set of three users 806-808 are marked as belonging to a second segment, segment 2. During live, real-time testing of web sites, alternative versions of web pages are provided to subsets of the total number of users, or customers, accessing the web server. During a particular test run, altered web pages are provided to a specified segment of users. A segment of users can be defined by any of a wide variety of different parameters. For example, a segment of users may be defined by the web page or link by which the users or customers navigated to a test page served by the web server. Segments may be defined by time periods, by the Internet domains through which users access the Internet, or by many other different criteria.

Figure 9:
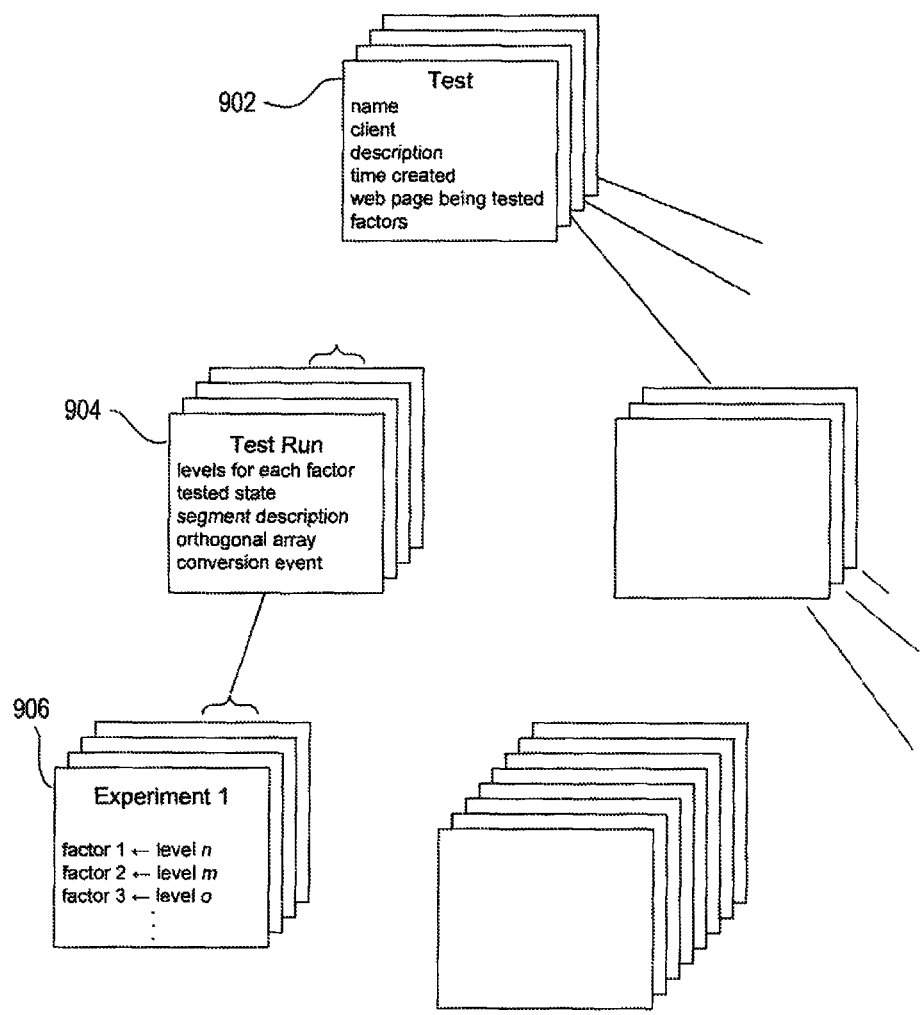
FIG. 9 illustrates the data and data structures that define tests, test runs, and experiments.

FIG. 9 illustrates the data and data structures that define tests, test runs, and experiments. A testing service may, at any given time, carry out a large number of different tests for many different client web-site-based organizations. Each test is defined by a test record, such as test record 902 in FIG. 9. Information contained in the test record includes an alphanumeric test name, an identifier for the client on behalf of whom the test has been created, a description of the test, an indication of the time that the test was created, an indication of the web page subject to the test, and a list of the factors that may be involved in any particular test run associated with the test. Note that the factors can be specified by the identifiers associated with features or objects displayed in the web page. For example, referring to FIGS. 2-4, a list of factors for a test of the exemplary web page shown in FIG. 2 may include the alphanumeric strings: "wm_headline," "wm_hero," "wm_offer," and "wm_button."

Any particular test may be carried out over a series of test runs. For example, each test run may be carried out at a different time, with respect to a different segment of users, and may test a different array of features and feature levels. Thus each test record, such as test record 902 in FIG. 9, may be associated with one or more test-run records, such as test-run record 904 in FIG. 9. Test-run records include information such as the levels to be used for each factor, with the levels specified as URLs, of other references to images and other resources, or as text strings or other data directly displayed by the browser, a current stage of the test run, a description of the segment to which the test run is directed, an indication of the particular orthogonal-array basis or other test design for the test run, and an indication of one or more conversion events for the test run. Finally, using the orthogonal-array basis or other test design selected for the test run, a test run is associated with a set of experiments, such as experiment 906 in FIG. 9. Each experiment corresponds to an altered web page that is displayed to users during the test run. An experiment is essentially defined by associating each factor, tested in the test run, with a particular level, or referenced resource, according to a matrix of test pages generated by the orthogonal-array basis or other test design selected for the test run.

Figure 10:
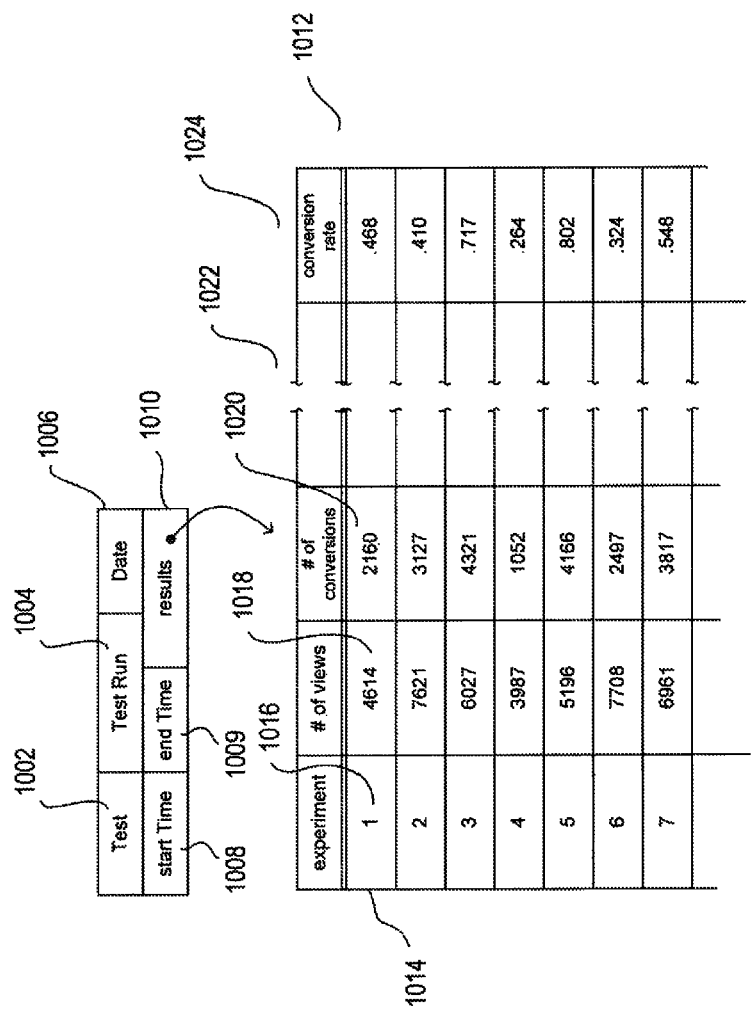
FIG. 10 illustrates the nature of the statistics, or test results, that are collected for a particular test run.

FIG. 10 illustrates the nature of the statistics, or test results, that are collected for a particular test run. The results include indications of the test 1002 and test run 1004, the date on which the test run was conducted 1006, a start time and an end time for the test run 1008-1009, and a reference 1010 to a results table 1012 in which test results are tabulated. The test results table includes a row for each experiment associated with the test run, such as row 1014 in experimental-results table 1012. The row includes an indication of the experiment to which the row corresponds 1016, a count of the number of the times the page corresponding to the experiment was accessed by a user of an active segment 1018, an indication of the number of times a user who accessed the test page generated a corresponding conversion event 1020, other similar numerical information in additional columns 1022, and finally, a computed conversion rate 1024 for each experiment. The test results shown in FIG. 10 are but one example of the type of statistics and data that can be collected during a test run. Different or additional statistics may be collected according to different test configurations created by test-service clients.

There are many different possible ways of testing a web server in order to accumulate test results, discussed above with reference to FIG. 10, for tests defined for particular web pages and factors associated with those web pages, as discussed above with reference to FIG. 9. One method would require the web server to design a test by creating all or a subset of possible alternative test pages and to then develop a test-page-serving system that would execute concurrently with, or as part of, the web server on an intermittent or continuous basis. As discussed above, testing methods and systems that require the web server to develop and run tests may be prohibitively expensive, both in time and resources, for web-site owners or web-site-based organizations. Furthermore, such testing methods can inadvertently cause serious financial losses and other non-financial damage to a web site. For example, were the test pages improperly constructed or served, sales or other activities generated by real-time users may be lost and, in worst cases, the web site could potentially lose business from particular customers and users altogether. Real-time testing additionally involves significant security risks. A malicious hacker or employee might be able to alter the test system to display fraudulent or offensive test pages, for example. Finally, similar to problems encountered in a variety of physical and behavioral systems, poorly or improperly design tests may so perturb the system being tested that the statistics collected from the tests are meaningless or, in worst cases, lead to false conclusions. For example, a properly designed test engine may introduce significant delays in web-page service to customers or users. As a result, the conversion rate measured during a test run may fall precipitously, not because of particular alterations made to test web pages, but instead because the significant time delay encountered by users for whom the test page is constructed and to whom the test web page is transmitted. For these, and many other reasons, web-site-based-organization test design and execution can be undesirable and, in worst cases, disruptive and damaging to the web-site-based organization.

An alternative approach involves using a third-party testing service, in tandem with the web server that serves the web site to be tested. However, simply conducting tests by a third-party server does not guarantee that the many pitfalls and disadvantages discussed above with respect to web-site-based-organization test design and execution are necessarily avoided. In fact, in many cases, the pitfalls and disadvantages discussed in the preceding paragraph may be exacerbated by third-party testing of web sites and web servers. For example, in the case that a test web page, requested by a customer, needs to be prepared by the third-party server, in response to a request generated by the web site as a result of a user request for the web page being tested, test-page serving may be significantly delayed, deleteriously perturbing the users' interaction with the web server to the point that the test statistics end up meaningless or misleading. As another example, security issues may be compounded by distributing testing tasks between a web-server computer system and a third-parting testing server. Web-analysis methods and systems employ an array of techniques and features that address these pitfalls and disadvantages, and that provide minimally intrusive and cost-effective testing for web sites and web servers.

Figure 11:
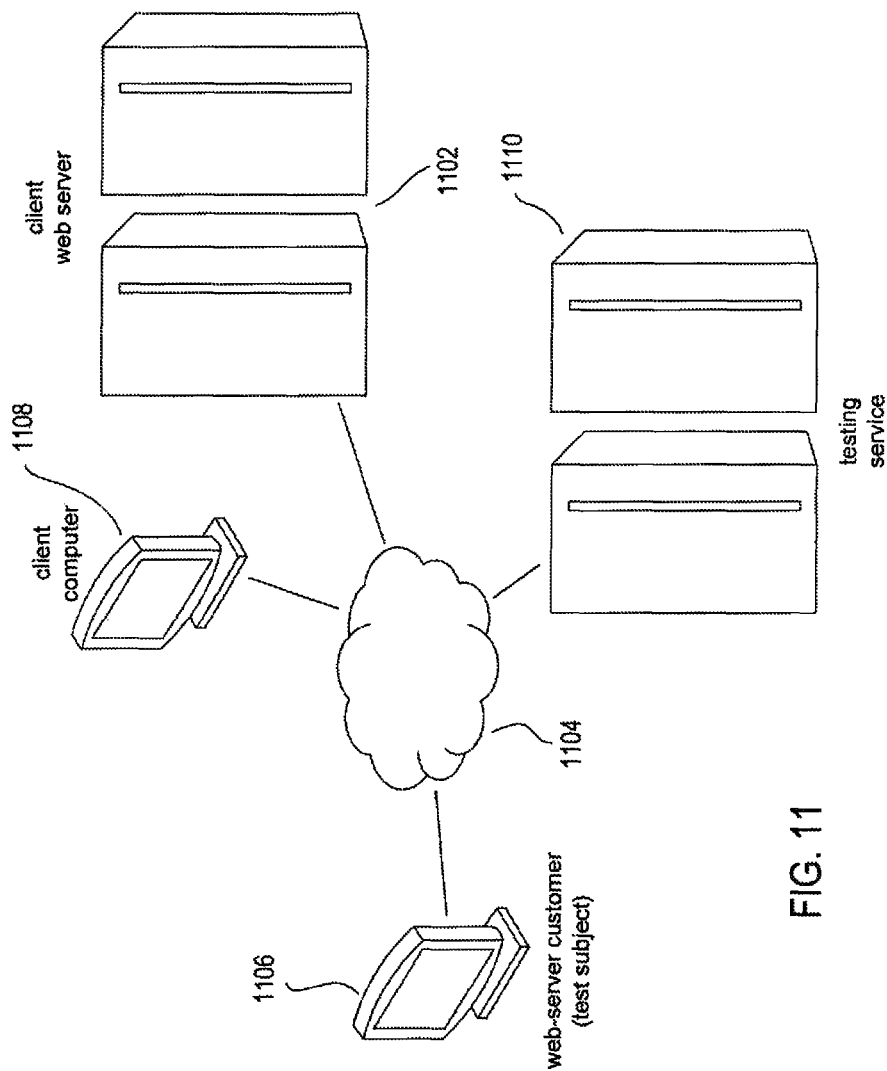
FIG. 11 illustrates an example testing environment.

FIG. 11 illustrates the testing environment for carrying out web-site testing. In FIG. 11, the web site 1102 is represented as one or more servers or large computer systems that serve web pages through the Internet 1104 to a generally large number of web-site users of customers, including user 1106. The web site or web server is regarded, in the following discussion, as a client web server of the testing service. The client web server also includes a client computer 1108 by which the client web-server-based organization can access various third-party services and web servers through the Internet. Finally, a web-site testing service is provided by a distinct server or servers 1110 accessible to the client web server 1102, the web server customer 1106, and client computer 1108 via the Internet 1104.

The testing service is used by the client web-site-based organization, referred to as the "client," below to design and run real-time, live tests of web pages provided by the client web server to users. The testing service may run on the same computer systems as the client web server. In general, the testing service is geographically distinct from the client web server, and is concurrently used by multiple, different clients for concurrently executing many different test runs on behalf of the multiple clients.

FIGS. 12A-H illustrate the general method and system for web-site testing. FIGS. 12A-H all use the same illustration conventions, in which large rectangles represent the four entities shown in FIG. 11.

Figure 12A:
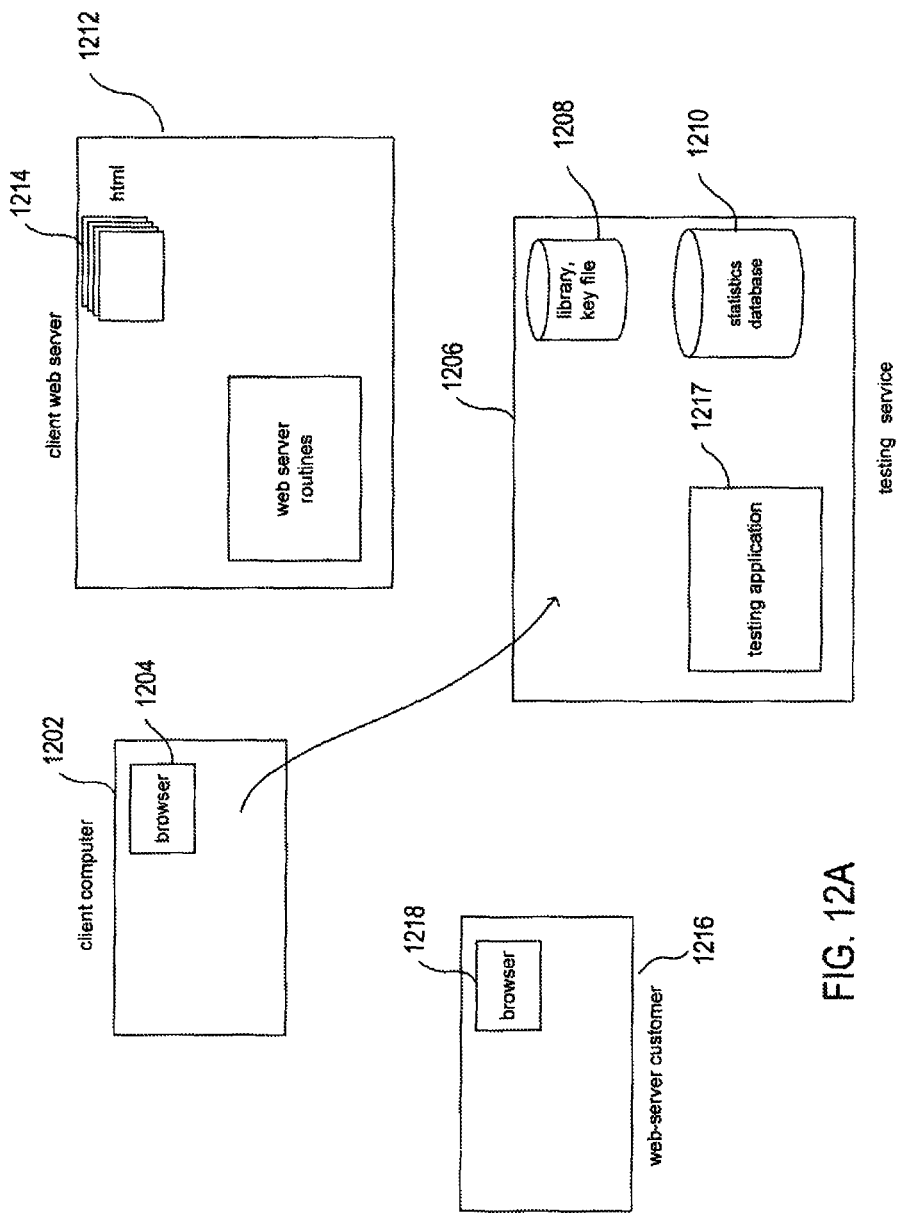

A client establishes a relationship with the testing service, as shown in FIG. 12A, by accessing the testing service through a browser executing on the client computer. As shown in FIG. 12A, an employee or owner of the client web server uses the client computer 1202 to access a testing-service web site, via a browser 1204 running on the client computer, which allows the client web server to register as a client of the testing service. The testing service 1206 includes one or more databases 1208 and 1210 that store information used to construct library and key files that are downloaded to client web servers, store statistics collected during testing, and store various different data objects and records that describe clients, tests, test runs, experiments, and other data used to conduct web-site testing. The client web server 1212 serves a number of different web pages described by HTML files 1214 to users, represented by user 1216 who accesses the web pages served by the client-web-server through a browser 1218 running on the customer computer 1216. The testing service and client web sever additionally include web-server engines, application programs, and other components of servers and computer systems (1215 and 121 in FIG. 12A).

Figure 12B:
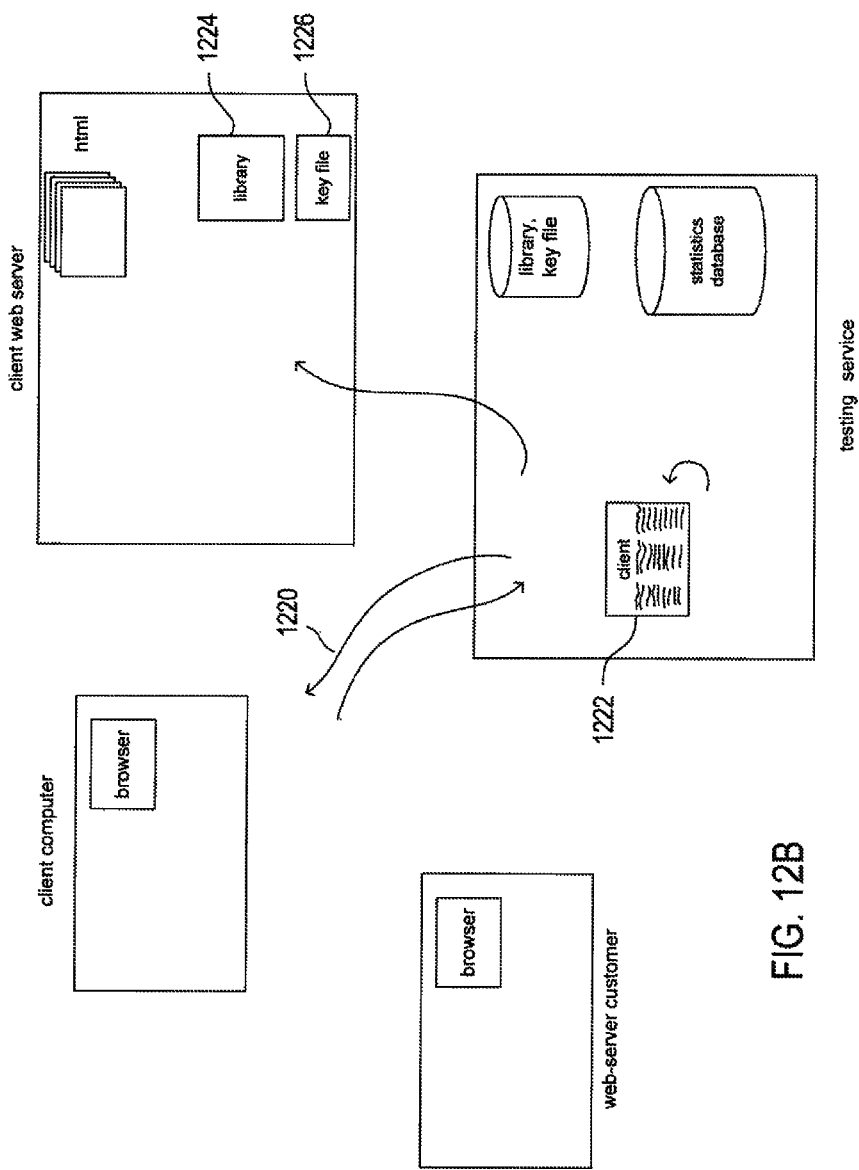

As shown in FIG. 12B, the client carries out a dialog 1220 with the testing service in order to provide the testing service with information about the client that allows the testing service to prepare a client record or records 1222 that describe the client and to store the client record or records in the database. In addition, the testing service may undertake various authorization and authentication steps to ensure that the client web server is a valid web server and that the client can transmit remuneration for testing services to the testing service. As part of client initialization, the testing service prepares a script library 1224 and a key file 1226 that the testing service downloads to the client web server. The script library 1224 includes routines that are called by client-web-server users during web-site testing. This library is referred to as a "script library" because script routines are often provided to browsers for execution. However, other types of routines may be provided by other types of libraries. The key file 1226 includes cryptographic information that ensures that all information exchanges that occur between client users and the testing service are secure.

Figure 12C:
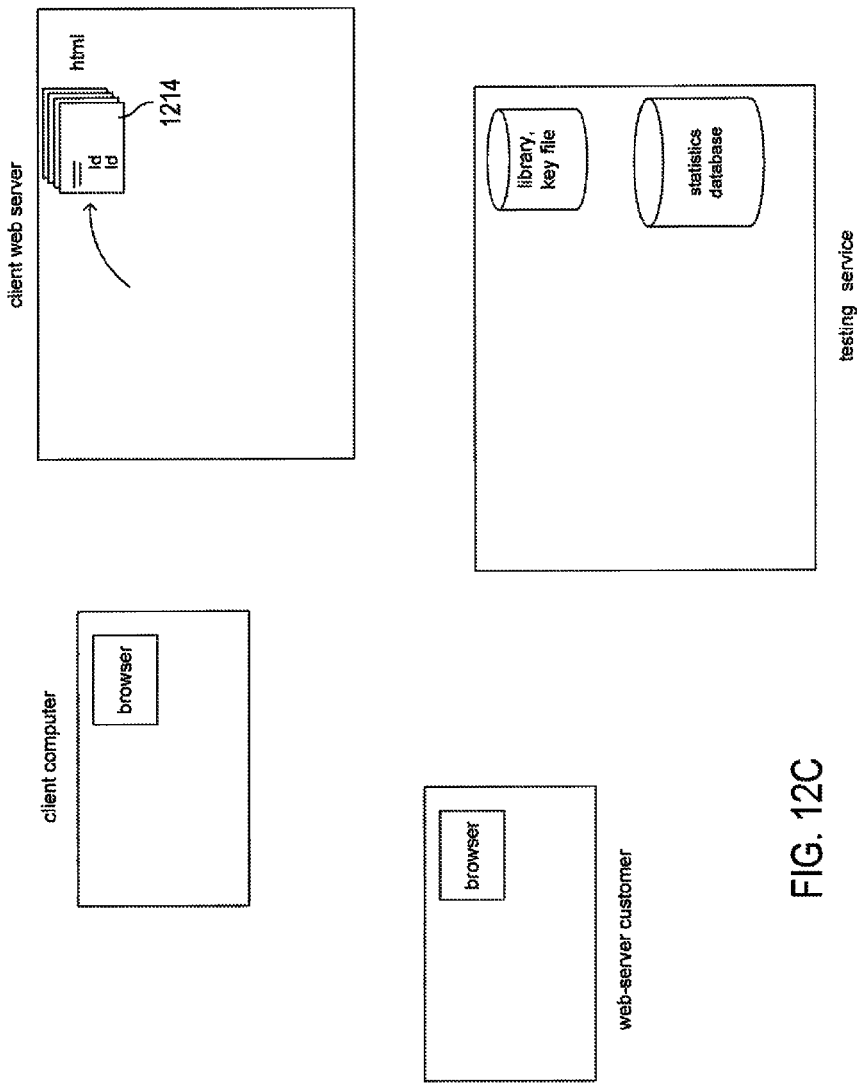

As shown in FIG. 12C, following client initialization, the client modifies any of the HTML encodings of web pages that may be altered during testing of the client-web server by the testing service. The alternations are minimal. To each HTML file that encodes a web page that may be tested, the client generally adds only two single-line statements and, in the case that display objects are not associated with identifiers, as discussed above with reference to FIG. 3, the client web server provide identifiers for each of the objects that may be specified as factors for testing of web pages. The single-line statements are generally identical for all client web pages, greatly simplifying modification carried out by the client. The first statement results in downloading of a script library from the client-web server, and the second script launches one or more information exchanges between the testing server and user computer. In the case that a conversion event is tied to a specific user-activated display device, such as a button, a call to a conversion script is inserted into the HTML file, so that user activation of the user-activated display device generates an information-exchange transaction with the testing service corresponding to a conversion event. As discussed above, these may be the HTML identifiers discussed with reference to FIG. 3, or other types of identifiers. In many cases, simple changes to the HTML files can be automatically carried out by a script or by routines provided by a content-management-service application-programming interface.

Figure 12D:
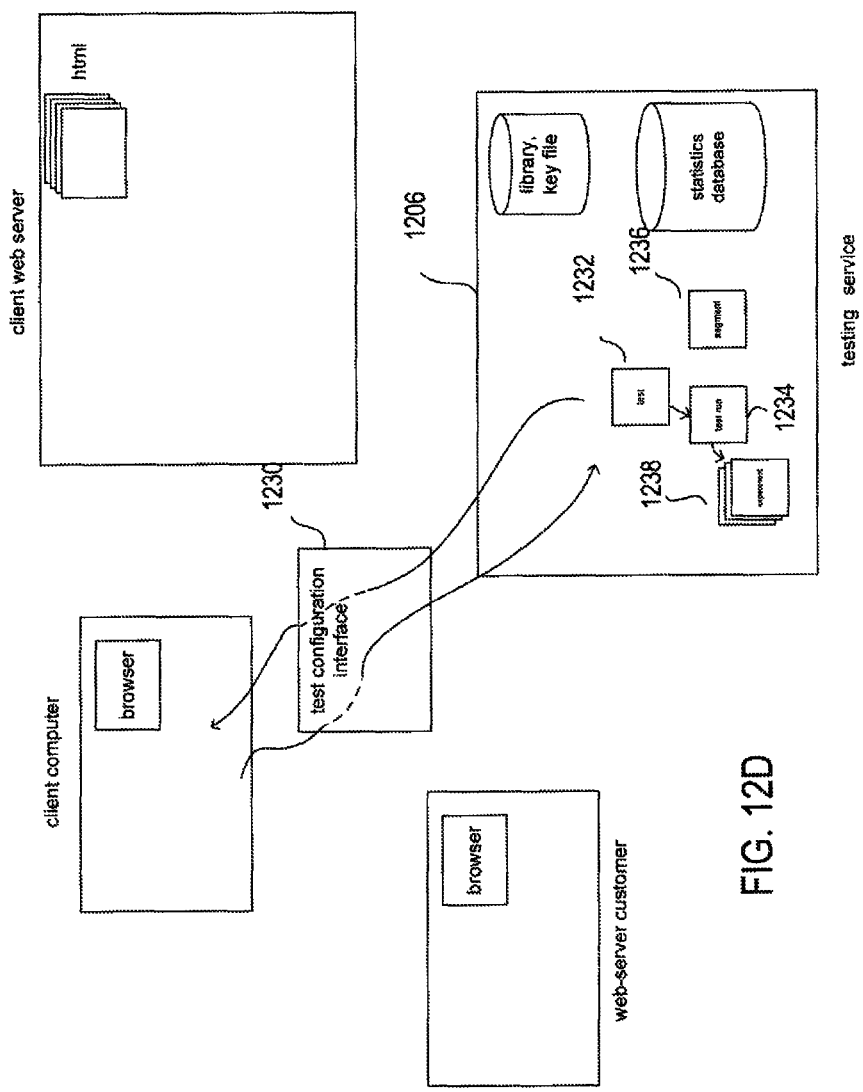

Following client initialization and modification of the HTML-file encodings of web pages that may be subsequently tested, the client can configure and run tests through a test configuration interface provided as a website by the testing service to clients, as shown in FIG. 12D. The test configuration interface 1230 allows the client computer to define tests 1232, specify and modify already-specified test runs 1234, and specify segments 1236, and using client-supplied test and test-run specifications, the testing service generates the experiments 1238 associated with each test run. All of the test, test-run, and segment information is stored in records associated with a reference to the client in one or more databases within the testing service. The test-configuration interface 1230 additionally provides run-time information to the client web server and allows the client web server to launch trial runs and test runs.

When a client web server has created a test and launched a test run for the test, the testing service provides modifications of the tested web page to users of the client-web-server during the test in order that the users receive altered web pages that constitute test experiments, and the testing service collects statistics based on users' access to web pages under test. This process is next described, with reference to FIGS. 12E-G.

When a client-web-server user 1216 accesses a test web page, the client-web-server user sends an HTML-file request through the Internet to the client web server 1212, as shown in FIG. 12E, which returns the requested HTML page to the client-web-server user 1216 for rendering and display by the browser 1218 executing within the user's computer. As the browser begins to process the HTML file, the browser encounters a statement 1240 that causes the browser 1218 to request the script library from the client web server. When the script library is downloaded by the client web server, the HTML file is modified, on the user computer, to launch an additional information exchange with the testing service to download additional library routines from the testing service. This additional information exchange is carried out only when the web page being processed is an active test page, the user computer is a valid test subject for an active test, and the additional library routines are not already cached in the user computer's browser. Insertion of the library-routine-fetch statement is one of the two modifications to the HTML files corresponding to tested web pages made by the client.

Figure 12F:
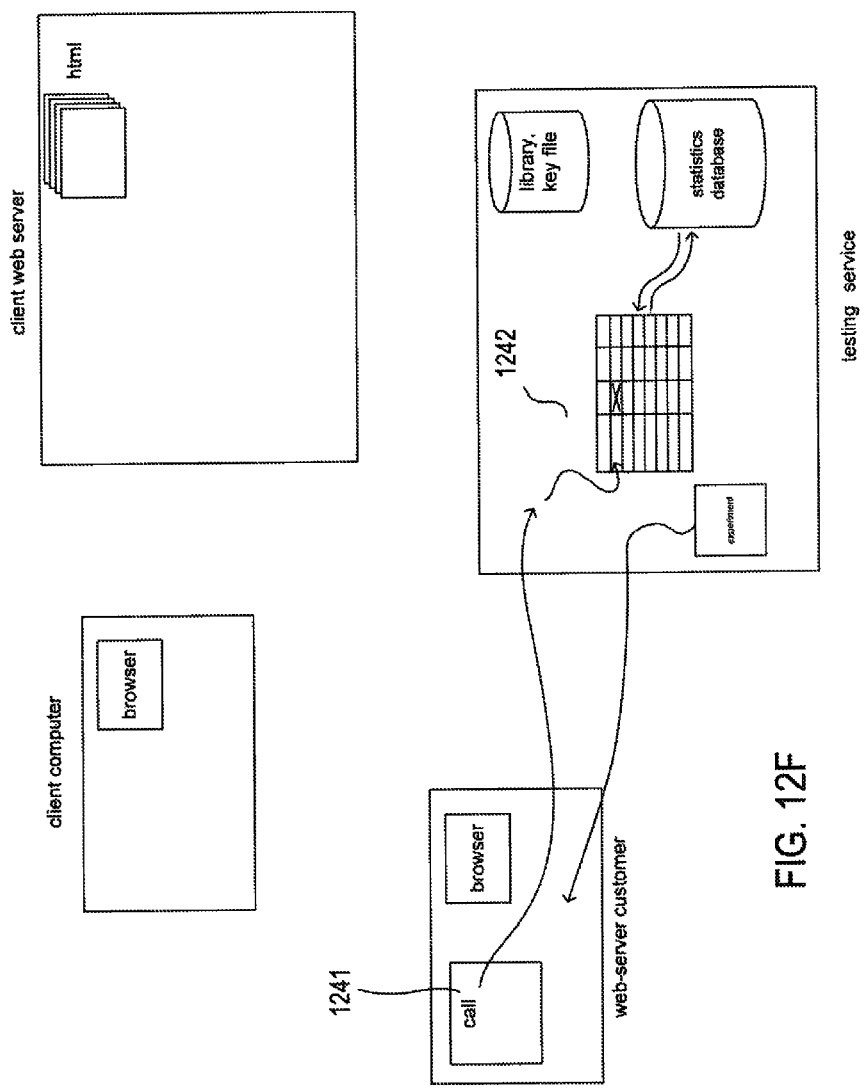
Figure 12G:
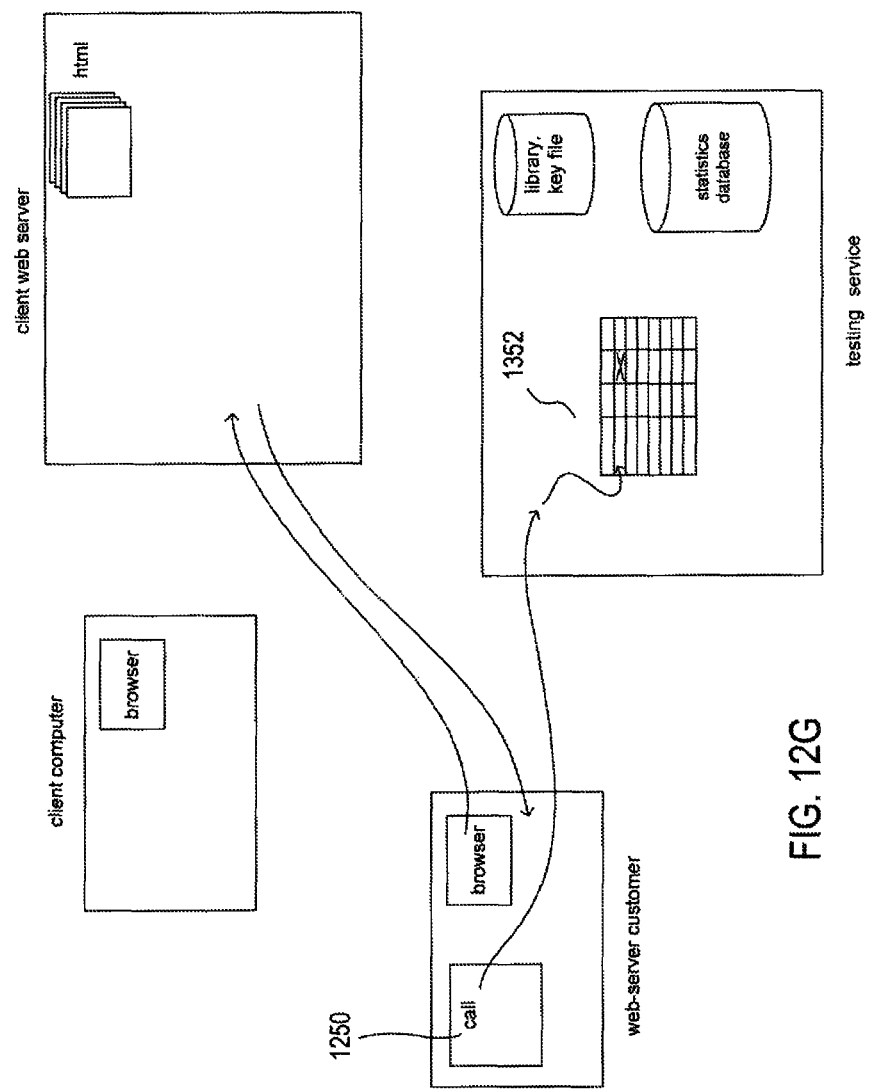

Next, as the browser continues to process the HTML, as shown in FIG. 12F, the browser encounters a call to the library routine "WM.setup" 1241. When executed by the browser, WM.setup initiates one or more information exchanges with the testing service during which the testing service can access cookies and other information associated with the web page on the user's computer, and the user computer receives web-page modifications from the testing service. Cookies can be used, for example, to ensure that a test subject who repeatedly accesses a landing page receives the same experiment, or test page, each time. Only when the web page being processed by the user computer is an active test page, and the user computer is an active test subject, are web-page modifications returned to the user computer by the testing service, and information uploaded by the testing service from the user computer. When this web page and user are validated, the testing service records the page accessed by the user, an identifier of the user, and a time of access in one or more database entries 1242 and returns a snippet, representing one or more nodes or sub-trees of the DOM corresponding to the web page, to the user computer, which modifies the DOM constructed by the browser incorporate the snippet downloaded by the testing service to the user. In other words, the testing service downloads modifications that transform the web page downloaded by the user to a particular altered web page representing an experiment. Thus, following the information transaction illustrated in FIG. 12F, the user's browser alters the DOM and displays to the user, the altered web page corresponding to an experiment as part of the test run. The snippet is constructed or retried by the testing service based on the orthogonal-array test basis of other test design. The stored test design defines the experiments from which the testing service selects experiments for provision to users in order to obtain a well-distributed sampling of experiments during the test. Subsequently, as shown in FIG. 12G, should the user download a page, or invoke a feature on a page, corresponding to a conversion event, the user's browser, in processing the HTML file, encounters a library call 1250 that results in an information transaction between the user and testing service. The testing service checks to ensure that the web page is a valid conversion page for an active test, that the user is a valid test subject. When all of these tests are valid, the conversion event is recorded 1352 for the experiment by the testing service.

Figure 12H:
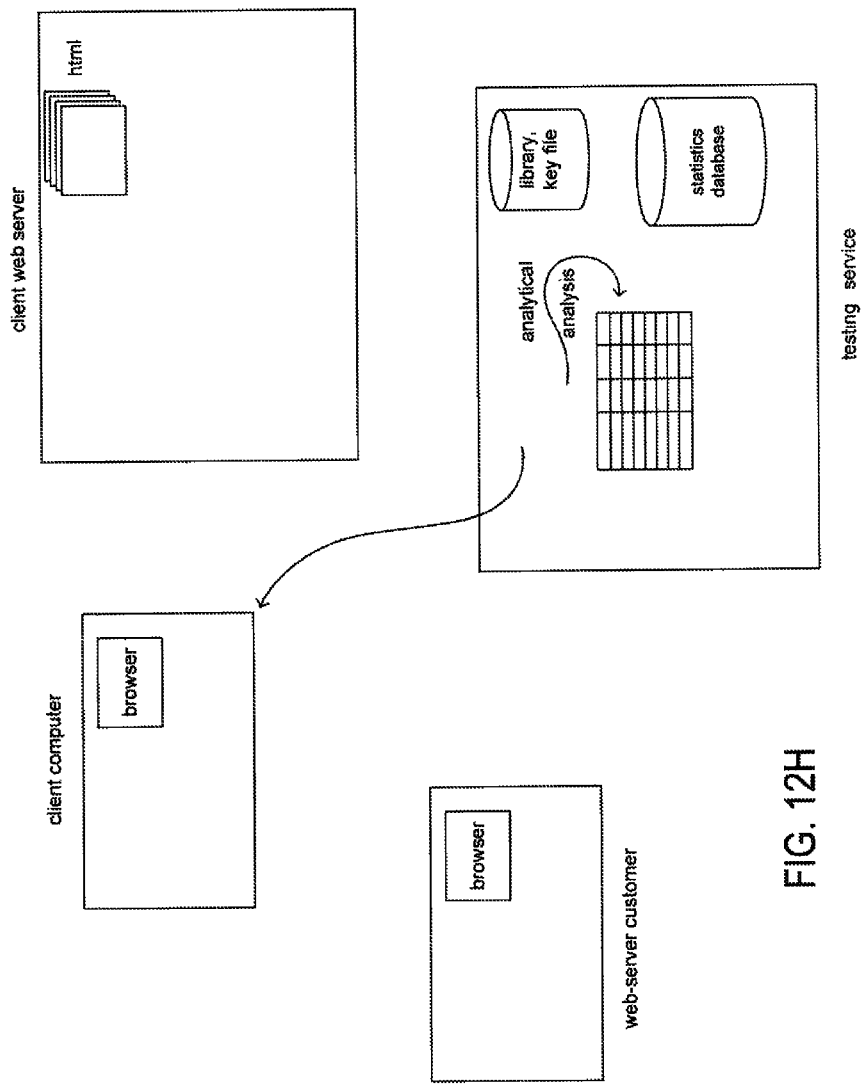

Finally, as shown in FIG. 12H, when the testing service has collected sufficient data to consider the test run to be complete, the testing service changes the status of the test run to complete, and may then undertake analysis and reporting of the test results. The test results may be automatically returned to the client web server or may be subsequently returned, on demand, when the client checks the status of the test run and determines that the test run has been completed.

The above-described testing service and web-analysis system is an example of an instrumentation-based data-collection and data analysis service. As discussed in the following section, methods of the present invention are directed to applying instrumentation-based data collection and data analysis to a broader range of devices and interfaces, including application programs executing on mobile electronic devices.

Embodiments of the Present Invention

Figure 13:
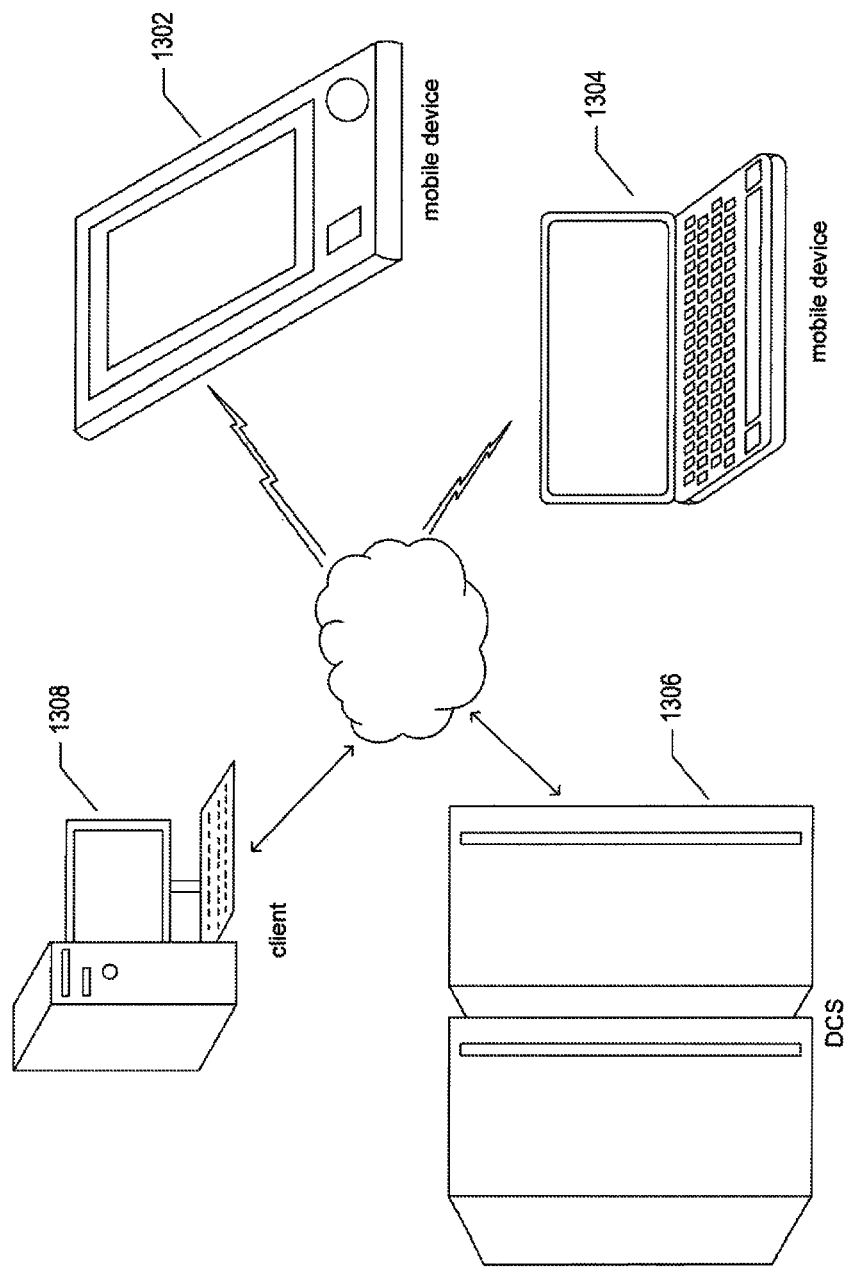
FIG. 13 illustrates recently emerging environments for data collection from instrumented application programs in which embodiments of the present invention may be applied.

FIG. 13 illustrates recently emerging environments for data collection from instrumented application programs in which embodiments of the present invention may be applied. In the web-browser-based instrumentation of deployed web pages, discussed above with reference to FIG. 11, data is collected in the context of web pages rendered for display by web browser applications running on user computers. In a more recently emerging environment, any of various application programs that run on mobile user devices, such as cell phones 1302, notebooks and electronic-tablet devices 1304, as well as on traditional personal computers, such as HTML5-compatible browsers, transmit data to a data-collection server 1306 for accumulation and analysis. Accumulated data and/or the results of analysis of accumulated data are transferred, following data collection and analysis or at intervals during data collection to a client 1308. In general, instrumentation is added by the client to application programs and web pages developed by the client and deployed by the client to the various user devices 1302 and 130, and the data-collection server or servers 1306 collect data generated by the client-inserted instrumentation within client-developed and client-deployed application programs and web pages on behalf of the client.

Data collection from instrumented application programs running on any of various different user devices provides a rich source of different types of data for collection by data-collection servers and analysis by analysis programs running on data-collection servers or other systems of testing and monitoring services, as well as a rich source of information for clients who deploy instrumented application programs, web pages, and other executable and/or renderable information. However, in many ways, data collection from instrumented application programs also provides a greater set of challenges to both data collection by testing and monitoring services as well as to clients who receive collected data and the results of analysis of collected data in the testing and monitoring services. A testing and monitoring service may endeavor to analyze user interaction with deployed web pages and application-program-generated and application-program-managed user interfaces, as in the web-page-optimization context discussed above in the previous subsection, but collection and analysis of data from instrumented application programs may also be used for more general data collection and analysis of user interactions with application programs, user behavior and activities, and even monitoring of the various types of environments within which users interact with user devices.

Figure 14:
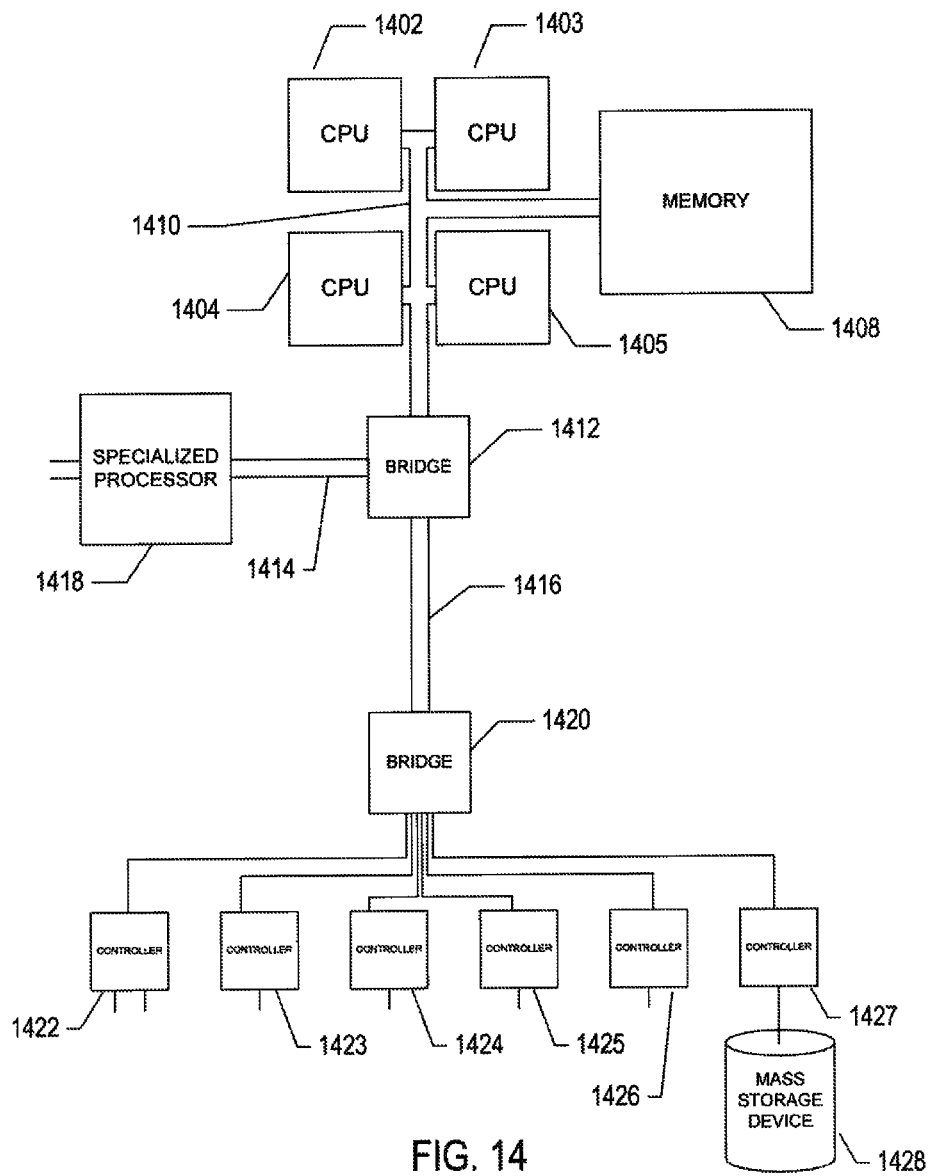
FIG. 14 illustrates a generalized computer architecture for a computer system that, when controlled by segment-subsystem component programs to generate and execute segment definitions, represents one example of the present invention.

FIG. 14 illustrates a generalized computer architecture for a computer system that, when controlled by data-collection and data-analysis programs, represents one example of the present invention. The computer system contains one or multiple central processing units ("CPUs") 1402-1405, one or more electronic memories 1408 interconnected with the CPUs by a CPU/memory-subsystem bus 1410 or multiple busses, a first bridge 1412 that interconnects the CPU/memory-subsystem bus 1410 with additional busses 1414 and 1416, or other types of high-speed interconnection media, including multiple, high-speed serial interconnects. These busses or serial interconnections, in turn connect the CPUs and memory with specialized processors, such as a graphics processor 1418, and with one of more additional bridges 1420, which are interconnected with high-speed serial links or with multiple controllers 1422-1427, such as controller 1427, that provide access to various different types of mass-storage devices 1428, electronic displays input devices and other such components, subcomponents, and computational resources. Examples of the present invention may also be implemented on distributed computer systems and can also be implemented partially in hardware logic circuitry. Mobile electronic devices include similar components, including processors, electronic memories, and internal data-transmission media. In addition, mobile electronic devices may include radio-frequency transceivers, GPS components, cameras, accelerometers, and many other sensing and communication components.

Figure 15A:
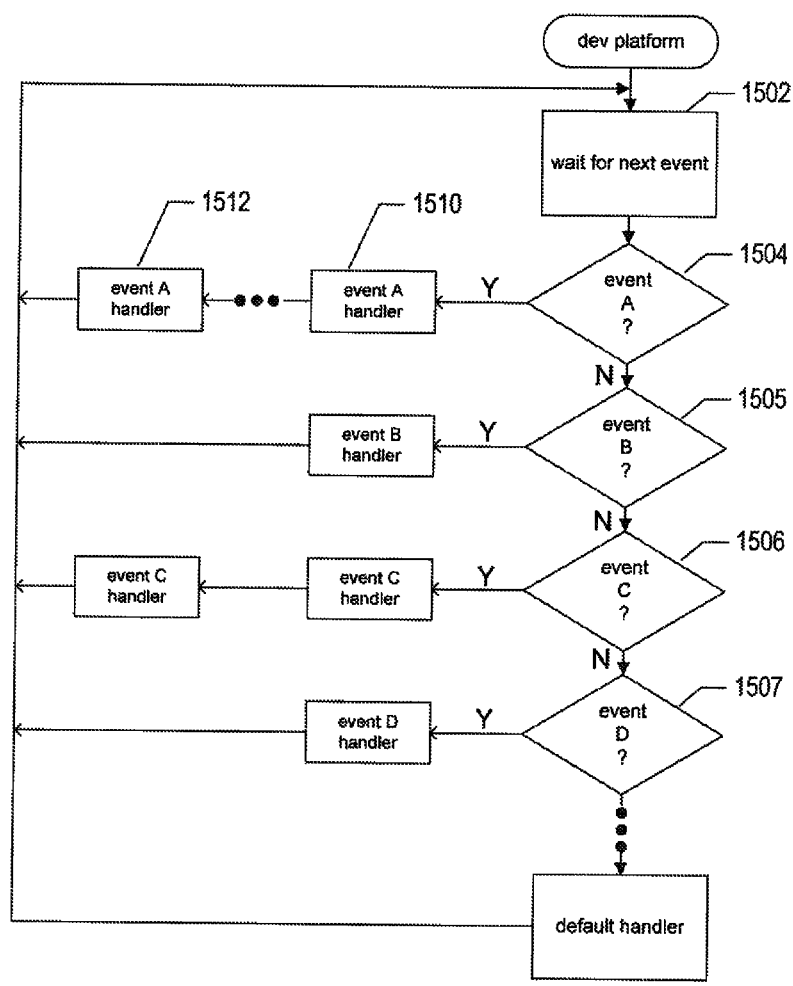
FIGS. 15A-B illustrate how instrumentation is added to an application that executes on any of various different types of user devices, including cell phones and electronic pads and tablet computers, according to one embodiment of the present invention.
Figure 15B:
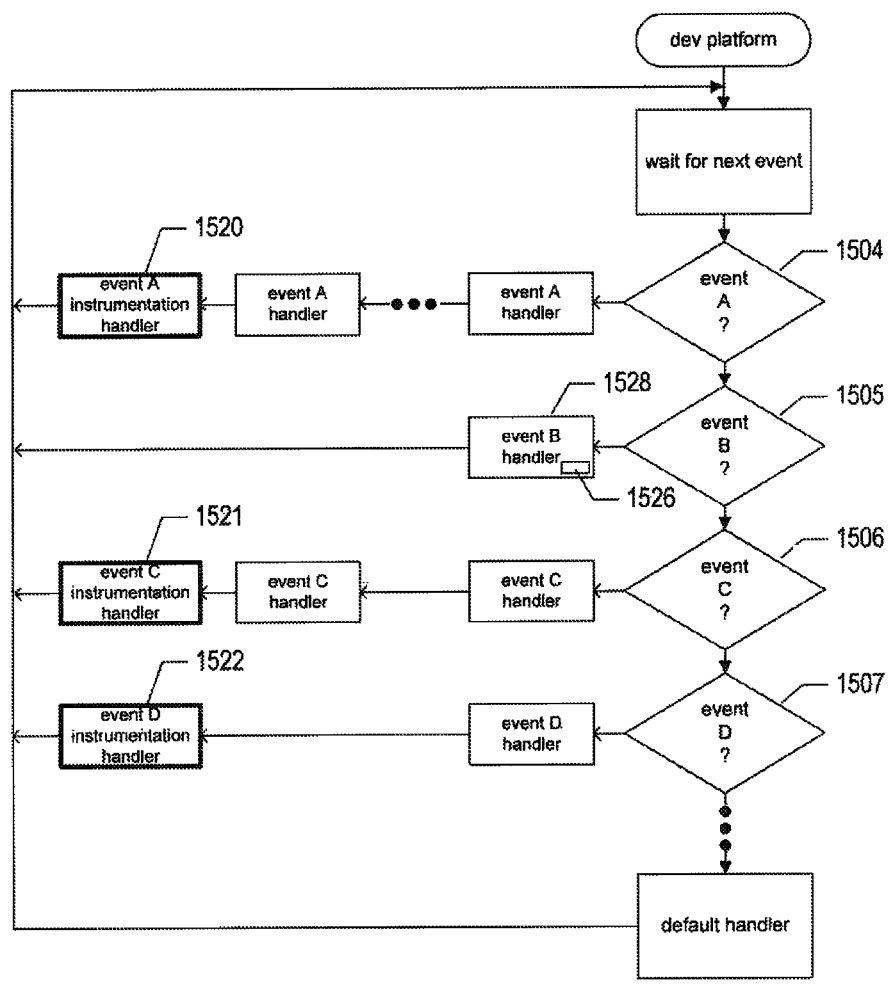

FIGS. 15A-B illustrate how instrumentation is added to an application that executes on any of various different types of user devices, including cell phones, electronic pads, and tablet computers, according to one embodiment of the present invention. In many of these types of user devices, the device operating system exposes an application-development environment consisting of a generalized event handler. Operation of the device is modeled as a set of one or more event handlers that are called in response to each of numerous different types of events that occur within the device. The event-handler-based application environment is modeled, in FIG. 15A, as a continuous event-handling loop in which the operating system waits for a next event to occur, in step 1502, and then in a series of conditional statements 1504-1507, determines which type of event has occurred in order to invoke execution of one re more event handlers for the event. When the occurrence of a particular event is determined, in one of the conditional statements 1504-1507, one or more event handlers are called by the operating system. For example, as shown in FIG. 15A, when event A occurs, a series of event handlers 1510 . . . 1512 are called, following execution of which control flows back to the wait-for-next-event step 1502. Often, the event handlers are sequentially ordered, with operating-system event handlers called first and application-program event handlers called following execution of the device event handlers. Certain events may be associated only with device event handlers, other events may be associated only with application-program event handlers, and certain events may be handled by a series of device and/or application-program handlers. The event handling model-based development environment, illustrated in FIG. 15A, represents a generalized development environment, details of which significantly vary from device to device and operating system to operating system. Application-program development for devices that provide event-handler-based development environment comprises development of a set of application-program event handlers to handle the various types of events that occur during execution of the application program, including an initial event corresponding to launching of the application program by a user.

FIG. 15B illustrates instrumentation of an application program developed within the development environment described above with reference to FIG. 15A. Instrumentation can be introduced as additional instrumentation-implementing event handlers added to the list of event handlers associated with particular events and may be included within event handlers associated with an application program. For example, in FIG. 15B, instrumentation event handlers 1520-1522 have been added to the list of event handlers associated with events A, C, and D 1504 and 1506-1507. In addition, instrumentation code 1526 has been added to an application-program event handler 1528 associated with the occurrence of an event B 1505.

Figure 16:
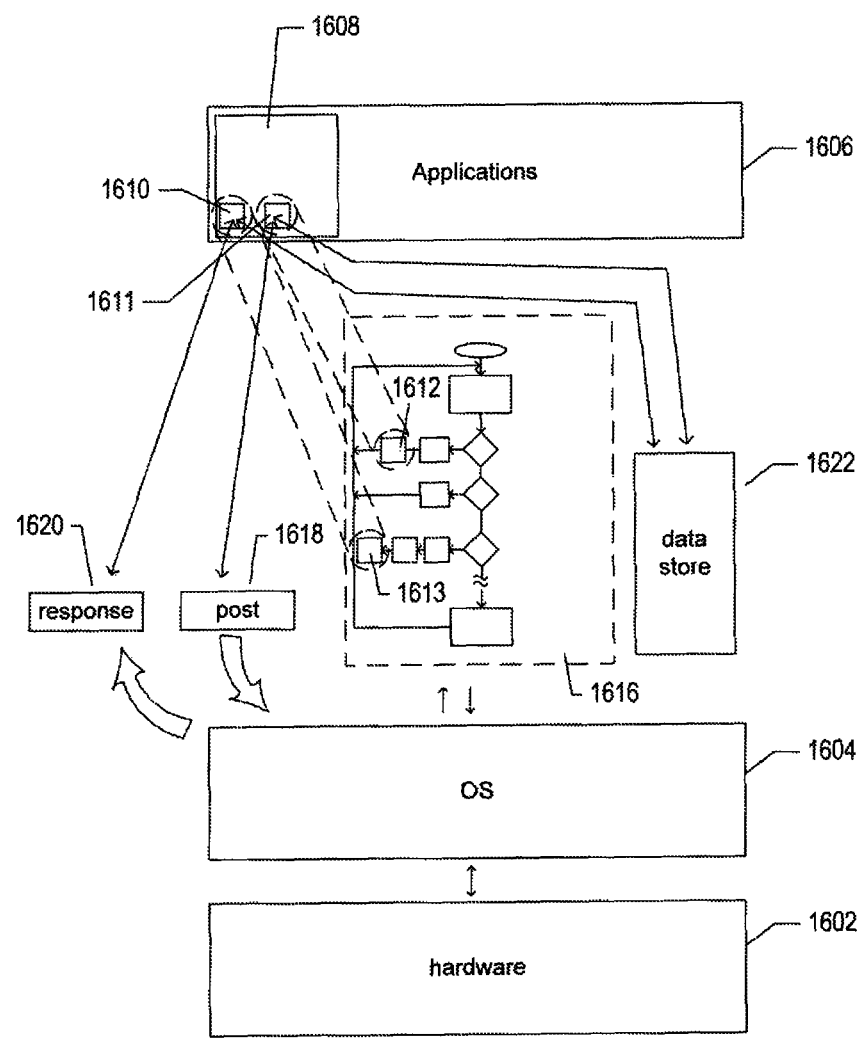
FIG. 16 illustrates functionalities of an electronic device employed for instrumentation of application programs according to embodiments of the present invention.

FIG. 16 illustrates functionalities of an electronic device employed for instrumentation of application programs according to embodiments of the present invention. In FIG. 16, levels of functionality within a user device, such as a mobile phone or computer, are shown as rectangular blocks 1602, 1604, and 1606. The physical hardware within the device represents a first level 1602 of functionality above which the device operating system 1604 executes to provide an execution environment for application programs. The application programs 1606 represent a third layer of functionality within the device. A particular application program 1608 developed by a client of a testing and monitoring service can be instrumented, according to embodiments of the present invention, in order to continuously, periodically, or during specified intervals, collect and transmit data to the testing and monitoring service. As discussed above, instrumentation within the application program can be inserted as event handlers or code within event handlers 1612 and 1613 of an event-handler-based application-development and application-execution environment 1616 provided by the operating system of the device 1604. In addition, the instrumentation inserted within an application may employ a message-posting interface 1618 and a response-to-postedmessage interface 1620 that allows the instrumentation code embedded within an application program to transmit data to a data-collection server and to receive responses to transmitted messages from the data collection server. Finally, instrumentation code can interface to a persistent data store 1622 which stores instrumentation-related data within electronic memory of the user device for access by instrumentation code. In certain cases, the persistent data store may be persistently stored, executable, and modifiable extensible markup language ("XML") configuration files. Alternatively, the persistent data store may be any of various low-overhead data-storage facilities provided by the user device to executable code running within the context of browser-rendered web pages and to other application-level executable code. Instrumentation code uses persistent data storage in order to store a variety of different configuration parameters that control various aspects of data collection and data transmission by instrumentation code included within application programs.

Figure 17:
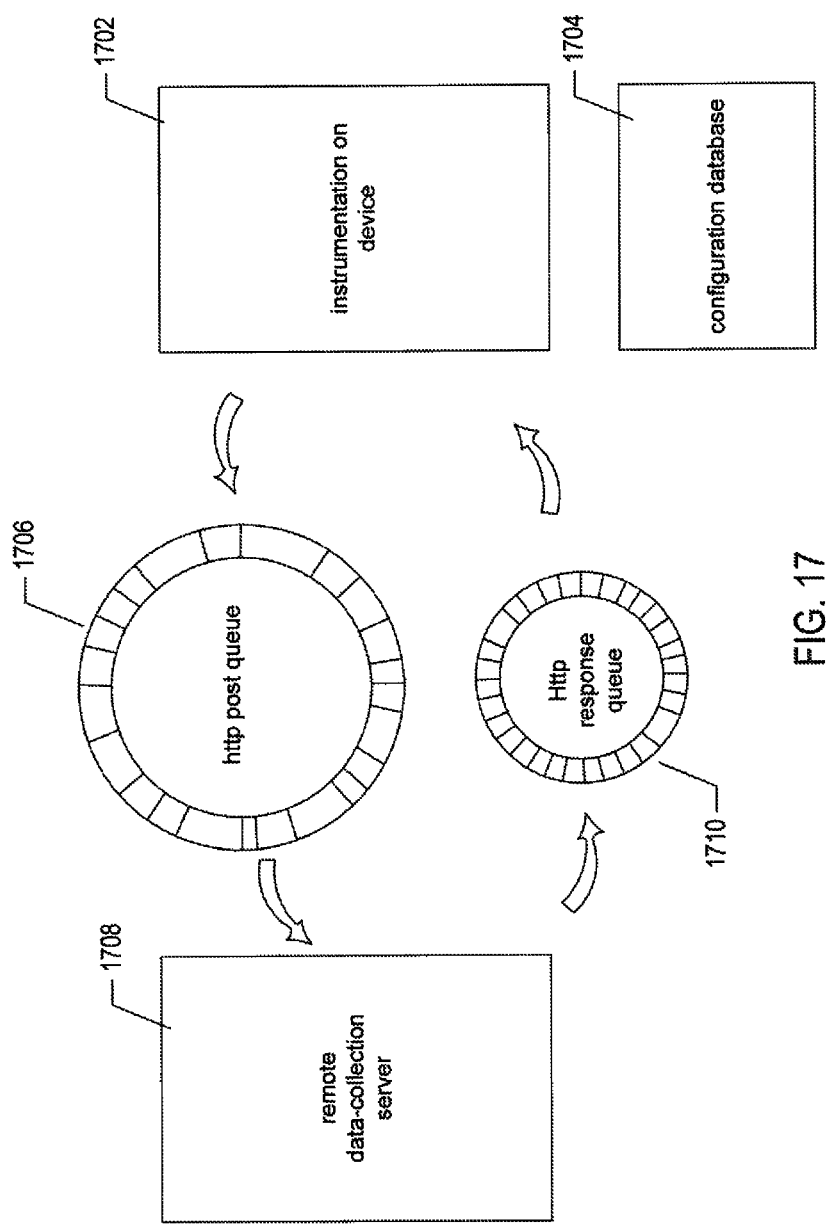
FIG. 17 illustrates operation of instrumentation embedded in application programs according to various embodiments of the present invention.

FIG. 17 illustrates operation of instrumentation embedded in application programs according to various embodiments of the present invention. As discussed above the instrumentation consists of event handlers and code added to application-program event handlers 1702 that are invoked during device operation. Instrumentation of executable code employs a persistent-data-storage functionality 1704, provided by the device operating system, in order to store configuration data and other data collected, transmitted, and used by the instrumentation executable code. Instrumentation executable code can post messages to an output queue 1706 from which the messages are de-queued and transmitted to a remote data-collection server 1708. Responses to received messages are transported by the remote data-collection server 1708 back to the user device and queued to a response queue 1710, from which instrumentation executable code can de-queue the response messages. In general, data that describes and encapsulates various aspects of device operation are transmitted in messages by the instrumentation executable code to the remote data-collection server. Responses to those messages may simply acknowledge receipt of the messages or may, in addition, contain data transmitted by the remote data-collection server back to the instrumentation executable code. In most cases, data transmitted from the data-collection server to the user device comprises changes to the configuration parameters stored within the persistent data store 1704. Thus, the remote data-collection server can continuously monitor and configure operation of the instrumentation inserted within application programs. In addition, in certain cases, the data-collection server can also monitor and change configuration parameters for the user device. In one implementation of the present invention, the hypertext transfer protocol ("HTTP POST") service and protocol are employed for transmitting messages from instrumentation executable code to the remote data-collection server. The HTTP POST service provides for secure transmission of data via the Internet via the secure HTTP protocol.

Figure 18:
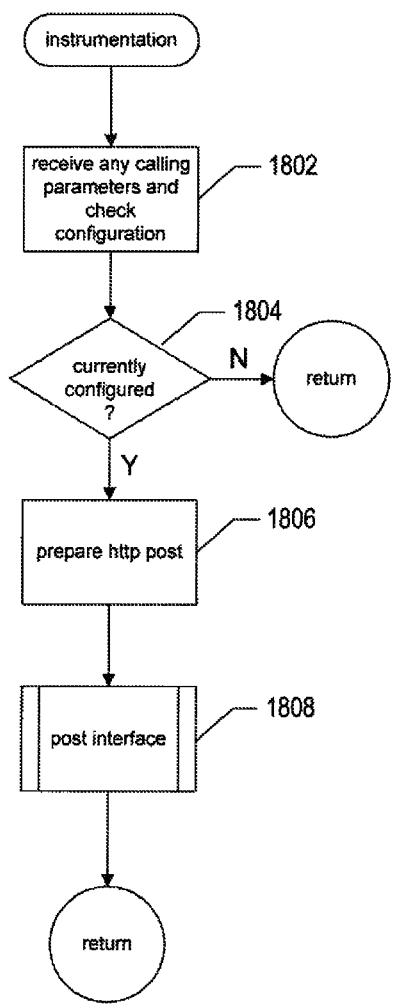
FIGS. 18-20 provide control-flow diagrams that illustrate instrumentation of application programs according to embodiments of the present invention.
Figure 19:
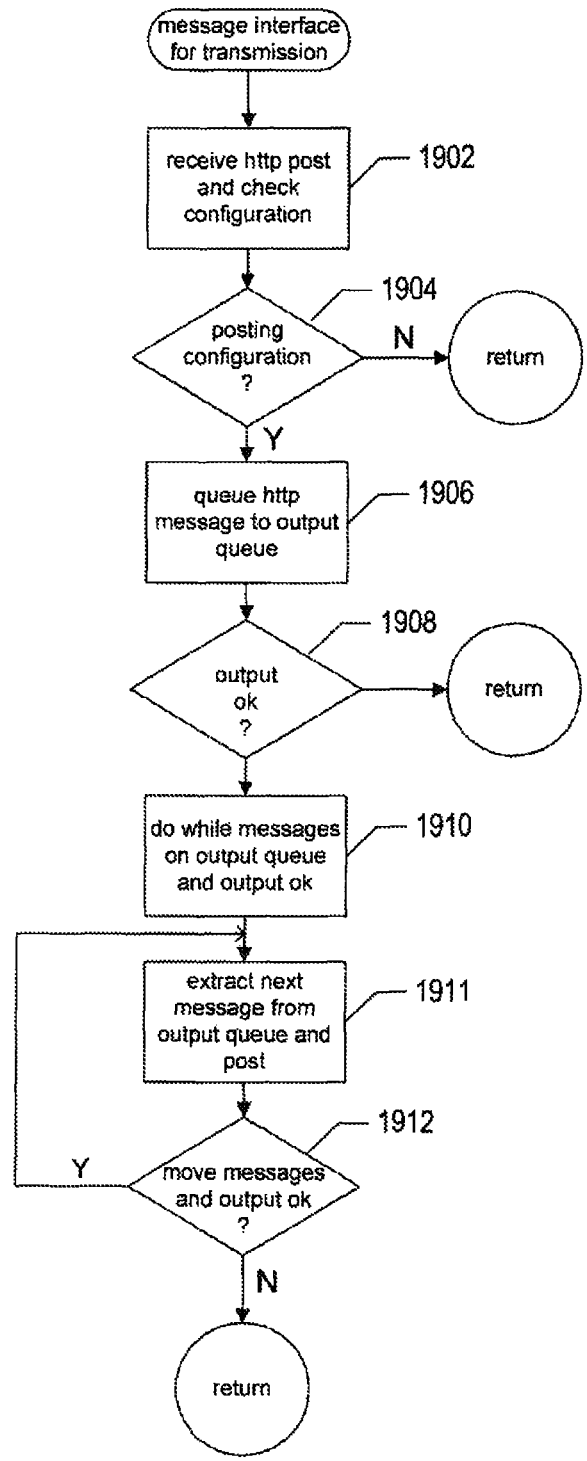
Figure 20:
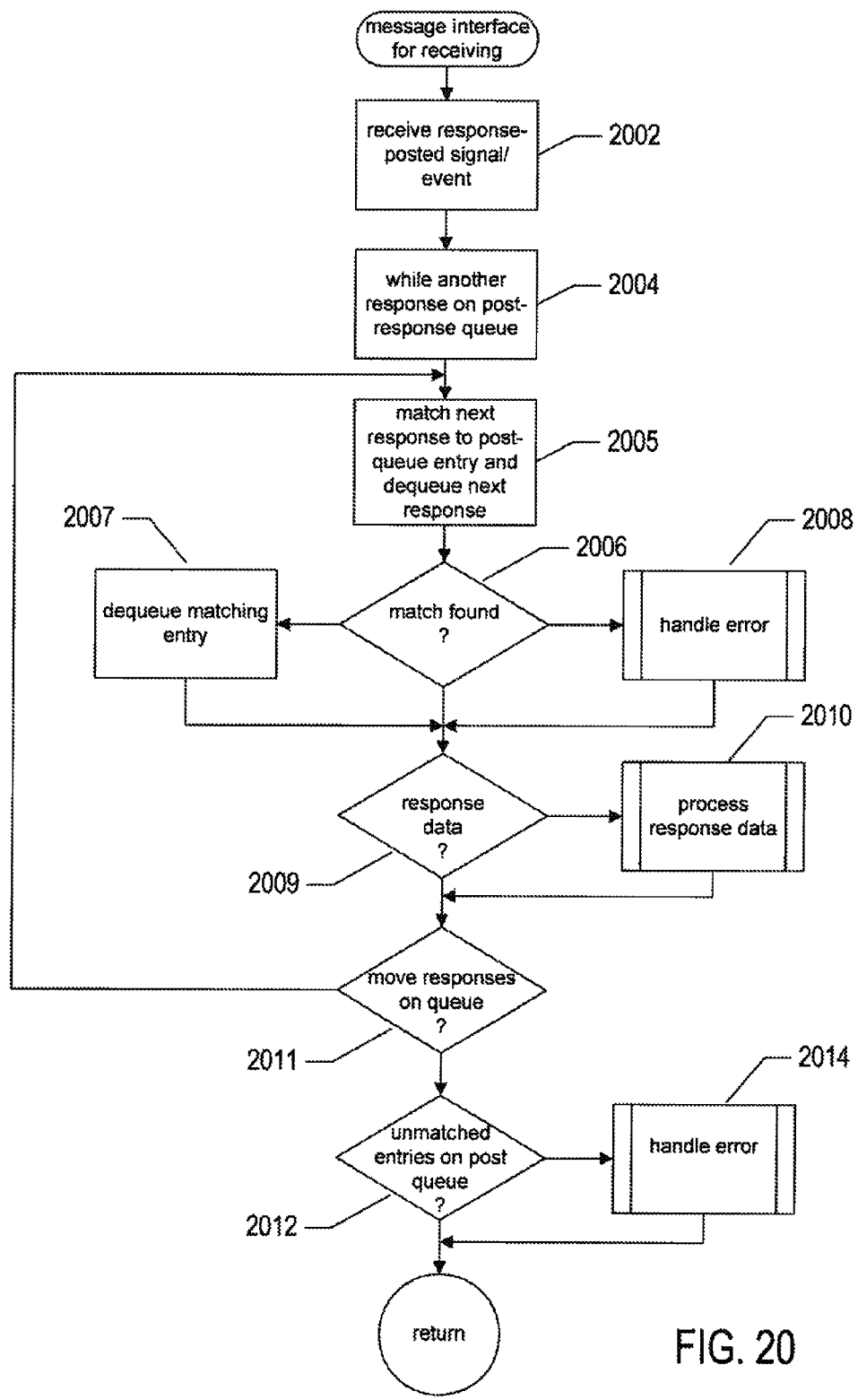

FIGS. 18-20 provide control-flow diagrams that illustrate instrumentation of application programs according to embodiments of the present invention. FIG. 18 provides a control-flow diagram for an instrumentation event handler or instrument code included in an application-event program event handler. In step 1802, the instrumentation receives any calling parameters associated with event-handler invocation or calling of instrumentation code by an application-program event handler and checks instrumentation configuration parameters in memory or in a persistent data store. If the instrumentation code is currently configured to transmit data, as determined in step 1804, the instrumentation code prepares an HTTP POST message, in step 1806, and provides the message to a message interface 1808 to queue the POST message to the message-interface output queue (1706 in FIG. 17).

FIG. 19 provides a control-flow diagram for the instrumentation message-interface for transmitting messages to remote data-collection servers. In step 1902, the message interface receives an HTTP POST message from instrumentation code and checks current instrumentation configuration parameters stored in memory and/or a persistent data store. When posting of messages is currently configured, as determined in step 1904, the received HTTP POST message is queued to the output queue in step 1906. When transmission of messages to remote data-collection servers is currently configured, as determined in step 1908, then, in the while-loop of steps 1910-1912, the messages interface transmits as yet untransmitted messages within the output queue to remote data-collection servers via the HTTP POST service.

FIG. 20 provides a control-flow diagram for the instrumentation message-interface for receiving response messages from remote data-collection servers. In step 2002, the message interface is invoked as a result of reception of a response message from a remote data-collection server. In the while-loop of steps 2004-2011, the message interface de-queues and processes responses from the response queue (1710 in FIG. 17). For each response, the post-response interface attempts to match the response to an entry in the output queue, in step 2005. When a match is found, as determined in step 2006, the matching entry in the output queue is de-queued in step 2007. If no match is found, then error-handling functionality is invoked, in step 2008. When the response contains data, such as a particular numerical code that indicates an action other than acknowledging receipt of a previously transmitted message, as determined in step 2009, then the data is processed in step 2010. In general, any data included in a response message other than an acknowledgment code is directed to updating one or more instrumentation configuration parameters. In the case that returned data encodes an update of one or more configuration parameters, the data processing step 2010 involves updating the data stored in the persistent data store (1622 in FIG. 16 and 1704 in FIG. 17). Finally, once all responses have been removed and processed, the post-response interface determines whether any unmatched entries remain on the output queue that, based on timers associated with the entries or on other considerations, are unlikely to be matched to subsequently received response messages in step 2012. An error-handling routine 2014 is called to process unmatched entries. For example, in certain cases the messages corresponding to the unmatched entries may be reposted, while in other cases, the entries may simply be de-queued and discarded.

Figure 21:
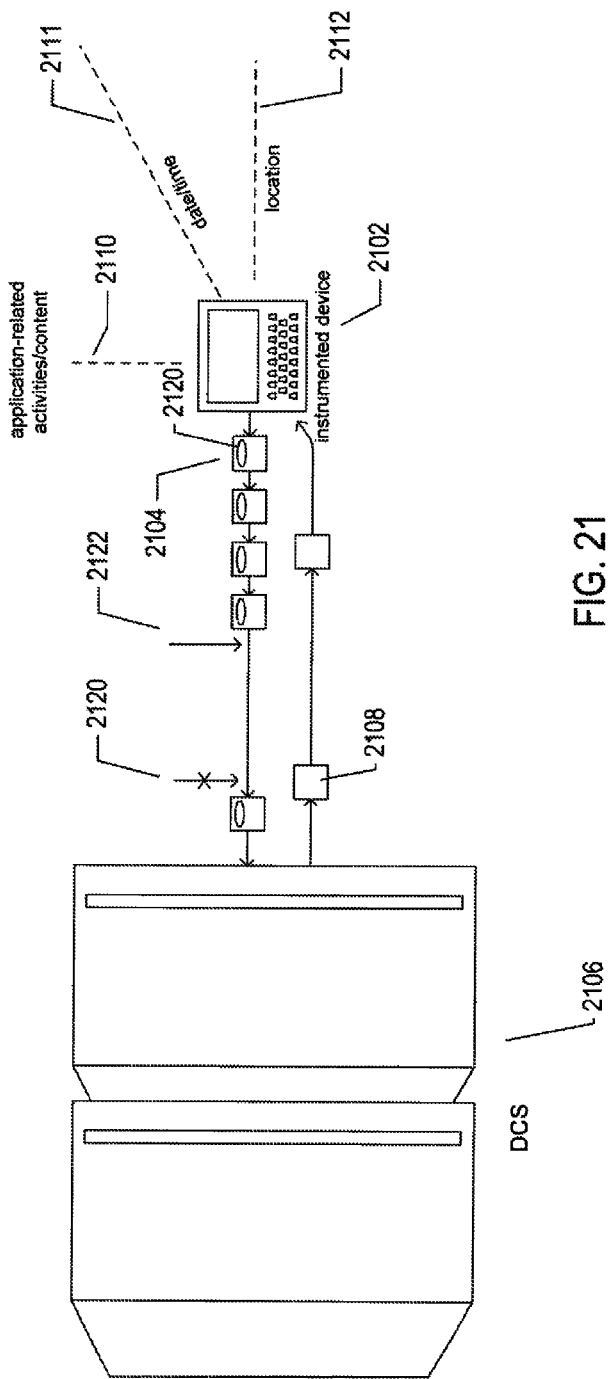
FIG. 21 illustrates application-program-instrumentation operation according to embodiments of the present invention.

FIG. 21 illustrates application-program instrumentation operation according to embodiments of the present invention. As discussed above, each instrumented application program within a user device 2102 sends data messages, such as data message 2104, to a data-collection server 2106. The data-collection server acknowledges those messages, through the HTTP Post protocol in one embodiment, and, at times, transmits data in response messages, such as data-containing response message 2108, back to the user device. User devices, including cell phones and electronic pads, maintain contextual information that can be accessed by application programs running within the user device as well as by instrumentation executable code included within the application programs and implemented as instrumentation event handlers. Instrumentation that represents embodiments of the present invention and data-collection servers that receive data from the instrumentation can employ this contextual information to monitor the user devices, activities of users using the devices, application program execution, and even the environments in which user devices are located. In addition, the data-collection servers and embedded instrumentation within devices can cooperate to provide fine-grained control over the type of data collected by the embedded instrumentation, the circumstances under which data is collected, and the types of data actually transmitted from user devices to the data-collection server. As an example, FIG. 21 shows a variety of dimensions of contextual information associated with the user device, each dimension represented by a dashed-line axis 2110-2112. The device can, for example, keep track of the devices geographical location 2112, the current date and time of day 2111, and the current operational state of one or more application programs within the user device 2110. In addition, as discussed above, the user device provides a persistent data store which is used by the embedded instrumentation to store a set of instrumentation-configuration parameters.

The operational characteristics of embedded instrumentation that represent embodiments of the present invention allow for many different possible types of control and configuration. For example, the data messages transmitted from the user device to the data-collection server may contain an identifier, such as identifier 2120 within message 2104, that identifiers the user and/or user device. A variety of different types of identifiers may be employed, depending on various considerations. For example, in order to conform to privacy laws within a particular region, the testing and monitoring service that operates the data-collection server may not be allowed to obtain information of sufficient particularity to identify a particular user by name, residence, place of employment, or by other such parameters that would allow the user to be uniquely identified. In this case, numerical user identifiers may be generated by instrumentation code in user devices to associate with transmitted data messages so that the messages transmitted from a particular user device can be associated, by the receiving data-collection server, with a single data source. However, no information is included in messages by the embedded instrumentation that would allow the data-collection server to identify the human user corresponding to the data source. Many other types of identifiers can alternatively be employed, each type associated with a particular level of potential user identifiability. As another example, the embedded instrumentation may monitor available communications bandwidth, available energy stored within user-device batteries, and other parameters and characteristics of the user device to determine when messages can be transmitted from the output queue to the data-collection server without negatively impacting user-device operation and may alter the amount or rate of data collection in order to prevent negative impacts to user-device operation. In yet another example, embedded instrumentation may be activated for data collection at particular times of day, on particular dates, when the user device is located within particular geographical regions, or under circumstances specified by a client of the testing and monitoring service, which ultimately receives data collected by the data-collection service and/or analytical results produced from that data.

In short, as shown in FIG. 21, the embedded instrumentation and the data-collection service to which data is sent by the embedded instrumentation can cooperate, according to embodiments of the present invention, to control a wide variety of aspects of data-collection and data-transmission. Data transmission can be stopped 2120 and restarted 2122 by the data-collection server or by the embedded instrumentation. The types of data, volume of data, types of identifiers associated with data messages, rate of data-collection, and the rate of data transmission may be controlled both by the data-collection server as well as by embedded instrumentation. Embedded instrumentation can be used to collect a wide variety of different types of information from a user device for monitoring and analysis by a data-collection server. The data-collection server can even collect information related to the environment in which the user device is located, activities of the user of the device, or activities of other individuals associated with the user. For example, a data-collection server may be able to monitor the flow of traffic along streets and highways by monitoring the location of user devices that are currently executing navigational applications. As another example, a data-collection server may be able to detect significant shifts in patterns of usage of a device that would indicate that the device may have been stolen and is being used by someone other than the devices owner, and may be able to alert the client, which, in turn, may take steps to prevent further malicious use and harm to the user.

Figure 23:
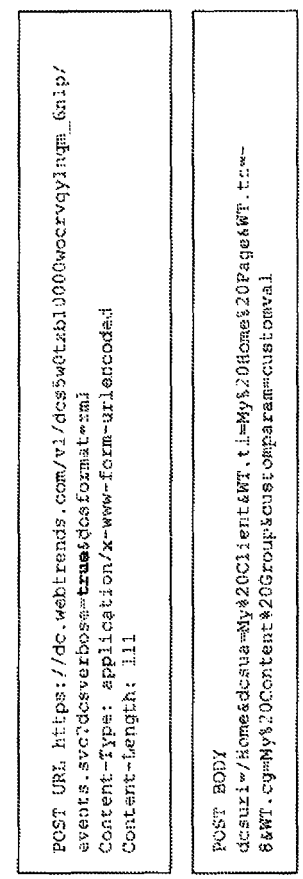
FIG. 23 provides an HTTP POST URL part and body, as one example of a data message transmitted from embedded instrumentation to a data-collection server in one embodiment of the present invention.

In one embodiment of the present invention, a software development kit ("SDK") is developed, by a testing and monitoring service, to allow for simple instrumentation of an application program by a client of the testing and monitoring service. The client need only include the library in the application and specify the values of configuration parameters in an XML configuration file that is accessed by the application program. FIG. 22 provides an example XML configuration file used in one embodiment of the present invention. The SDK automatically provides instrumentation event handlers for many common events of the event-based-development environment provided by a particular device platform. In addition, application developers may also include calls to instrumentation code within application-program event handlers and other application code. The SDK includes the uniform resource locator ("URL") to which HTTP POST messages can be directed by instrumentation embedded in the application program to data-collection servers or the URL of an internet service from which data-collection-server URLs can be obtained. Additional parameters included in the data-collection-server URL may direct particular messages to particular data-collection servers. HTTP POST messaging is used in certain embodiments of the present invention, but other types of messaging may be employed in alternative embodiments of the present invention. FIG. 23 provides an HTTP POST URL part and body, as one example of a data message transmitted from embedded instrumentation to a data-collection server in one embodiment of the present invention.

As discussed above, once an instrumented application is deployed, the configuration parameters associated with the instrumentation can be modified, by the testing and monitoring service or by clients through the testing and monitoring service to control many different aspects of data collection and data reporting. For example, the rate at which data is collected and transmitted to the data-collection servers may be controlled so that the data-collection servers receive up to some maximum volume of data within particular time periods according to agreements for data-collection volumes with clients. Clients can instruct the testing and monitoring service to collect data from particular user segments under a variety of different conditions. For example, the client may instruct the testing and monitoring service to collect data only from user devices located in large metropolitan areas from 10:00 o'clock in the morning to 2:00 o'clock in the afternoon on weekdays. The message-queuing interface embodied within the embedded instrumentation discussed above with reference to FIG. 17, allows data collection to proceed even when a device cannot communicate the data, in real time back to the data-collection servers, due to lack of access to transmission media or because message transmission is disabled. When the device can again transmit data, messages stored in the output queue to report events that occur when transmission was not possible or not configured can then be transmitted. The rate of data collection, when the device is offline, can be controlled to collect critical data but to avoid overwhelming the output queue during the period of time that the device is not able to transmit data. The data-collection server may, depending on the current data-transmission connections available to the user device, control the rate of data transmission by the embedded instrumentation in order to avoid impacting normal device operation and user applications. The embedded instrumentation may choose to collect and/or transmit different types of data based on the transmission bandwidth available to the device. When a device has been offline for a period of time, and a large amount of embedded instrumentation-related data is therefore available for transmission when the device can again transmit messages, the rate at which the stored data is transferred may be controlled in order to not adversely impact normal device operation and user applications. The size of the event queue, the time during which events are maintained on the queue without expiring, and other such message-interface characteristics can be monitored and altered by the embedded instrumentation as well as by the data-collection service in order to optimize data collection while minimizing adverse data-collection impacts.

The types of data collected by the embedded instrumentation and transmitted to the data-collection service may be controlled by instrumentation parameters so that data collection does not violate various privacy laws, corporate policies, and client rules and policies. For example, data collection may proceed when the user device is located within a jurisdiction that permits data collection, but may be immediately disabled when the user device is transported into a jurisdiction in which data collection is not allowed. Similarly, transmission of data regarding the location of a user or user device may be enable and disabled according to the location of the device and to various policies, rules, and instructions received from clients of a testing and monitoring service. Various types of user identifiers, as mentioned above, can be included in data messages sent from user devices to data-collection servers. Identifiers may include mobile-device IDs, cellular subscriber identity module ("SIM") IDs, randomly generated strings, identifiers generated and provided by the testing and monitoring service, various types of authenticated user names, and hashed visitor IDs. These various types of IDs may be ranked, according to the particularity with which they identify a particular user, in order to facilitate collecting data at a specified or required level of anonymity with respect to device users. Configuration parameters may also control the types and numbers of computational resources employed on behalf of the instrumentation code within a user device, including the amount of memory allocated, the number of threads launched, and the portion of processor bandwidth devoted to instrumentation-related activities.

In certain cases, large amounts of information may be collected by embedded instrumentation to facilitate debugging and development-related monitoring of deployed applications by clients. This type of data collection may be disabled once the application developer decides that the application has been debugged or developed up to some specified level. Many different types of error conditions that arise during application execution or during device operation may be detected and reported by embedded instrumentation. The embedded instrumentation automatically obtained by importing the SDK libraries into an application include the many different types of generalized events for which application handlers can be written, including application invocation, application termination, various types of input and display events, and other events provided in the event-based application-execution environment. In addition, application developers may include calls to instrumentation methods to collect data regarding arbitrarily defined events that application developers can detect, such as particular types of user input, viewing of particular content by users, and other such events.

Although the present invention has been described in terms of particular embodiments, it is not intended that the invention be limited to these embodiments. Modifications will be apparent to those skilled in the art. For example, configuration-controlled application-program instrumentation can be constructed using any of many different programming languages in many different ways by varying development parameters including, modular organization, data structures, variables, control structures, and by varying other such parameters. Any of various different permanent-data-store facilities can be employed by embedded instrumentation to stably store instrumentation configurations. Configuration parameters may include parameters that specify the times, dates, and locations during which data can be collected, the times, dates, and locations during which data can be transmitted, the types of data that can be collected, the events or classes of events for the occurrence of which data is transmitted, the types of data-source identifiers that can be included in messages, the size of, and operational parameters for, the output queue, and many other configuration parameters. Various types of data transmission protocols and media can be employed for transmitting data from the devices to the data-collection servers.

The foregoing description, for purposes of explanation, used specific nomenclature to provide a thorough understanding of the invention. However, it will be apparent to one skilled in the art that the specifics details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

The invention claimed is:

1. A configuration-controlled instrumentation system comprising:
 a user device that includes one or more processors that execute processor instructions encoded in an electronic memory within the user device that implement a user-device operating system which, in turns, provides an application-execution environment;

an application program that includes embedded instrumentation and that executes in the application-execution environment;

a persistent data store provided by the user-device operating system and used by the embedded instrumentation to store configuration parameters; and a messaging service through which the embedded instrumentation transmits data to a remote data-collection server and receives responses to transmitted messages from the remote data-collection server.

2. The configuration-controlled instrumentation system of claim 1 wherein the user device is one of a mobile phone, a smart phone, an electronic pad, an electronic tablet, an electronic media viewer, and a personal computer.

3. The configuration-controlled instrumentation system of claim 1 wherein the persistent data store is one of:
an XML configuration file;
a light-weight database application; and
persistent allocated memory.

4. The configuration-controlled instrumentation system of claim 1 wherein the messaging service includes:
a data-transmission-medium connection;
a transceiver;
an operating-system-provided communications interface and protocol;
an output queue to which messages are queued by a messaging interface on behalf of the embedded instrumentation and from which messages are dequeued and transmitted by the communications interface and protocol; and
a response queue to which messages, received by the communications interface and protocol in response to transmitted messages, are queued for processing by the embedded instrumentation.

5. The configuration-controlled instrumentation system of claim 1 wherein the communications interface and protocol provide an HTTP POST messaging interface.

6. The configuration-controlled instrumentation system of claim 1 wherein the embedded instrumentation includes:
embedded-instrumentation event handlers;
calls to embedded-instrumentation routines within application-program event handlers; and
call to embedded-instrumentation routines within the application program.

7. The configuration-controlled instrumentation system of claim 1 wherein the configuration parameters stored within the persistent data store include:
one or more parameters that specify times during which the embedded instrumentation collects data and passes the collected data to the messaging interface;
one or more parameters that specify days of the week during which the embedded instrumentation collects data and passes the collected data to the messaging interface;
one or more parameters that specify dates on which the embedded instrumentation collects data and passes the collected data to the messaging interface;
one or more parameters that specify locations of the user device in which the embedded instrumentation collects data and passes the collected data to the messaging interface;
one or more parameters that specify events that occur within the user device reported by the embedded instrumentation to the data-collection server;
one or more parameters that specify the type of identifier included in data messages transmitted to the data-collection server;
one or more parameters that specify the type of data included in data messages transmitted to the data-collection server;
one or more parameters that specify the volume of data collected by the embedded instrumentation;
one or more parameters that specify the rate at which data is collected by the embedded instrumentation;
one or more parameters that specify the types and numbers of computational resources within the user device that can be used by the embedded instrumentation;
one or more parameters that specify the size of an output message queue;
one or more parameters that specify the expiration time for messages queued to the output message queue; and
one or more parameters that specify when data can be transmitted from the user device to the data-collection server.

8. The configuration-controlled instrumentation system of claim 1 wherein the data-collection server controls, by sending response messages to the embedded instrumentation, embedded instrumentation operation by including the values of one or more configuration parameters in the response messages that, when processed by the embedded instrumentation, result in changes to the parameters stored in the persistent data store.

9. The configuration-controlled instrumentation system of claim 8 wherein the data-collection server controls the times during which the embedded instrumentation collects data.

10. The configuration-controlled instrumentation system of claim 8 wherein the data-collection server controls the times during which the embedded instrumentation transmits data.

11. The configuration-controlled instrumentation system of claim 8 wherein the data-collection server controls the days of the week during which the embedded instrumentation collects data.

12. The configuration-controlled instrumentation system of claim 8 wherein the data-collection server controls the days of the week during which the embedded instrumentation transmits data.

13. The configuration-controlled instrumentation system of claim 8 wherein the data-collection server controls the locations of the user device in which the embedded instrumentation collects data.

14. The configuration-controlled instrumentation system of claim 8 wherein the data-collection server controls the locations of the user device in which the embedded instrumentation transmits data.

15. The configuration-controlled instrumentation system of claim 1 wherein the data-collection server controls the types of identifiers included by the embedded instrumentation in data messages.

16. The configuration-controlled instrumentation system of claim 8 wherein the data-collection server controls the amount of data collected by the embedded instrumentation.

17. The configuration-controlled instrumentation system of claim 8 wherein the data-collection server controls the rate of data collection by the embedded instrumentation.

18. The configuration-controlled instrumentation system of claim 8 wherein the data-collection server monitors user-device characteristics, including battery charge, application-program activity, user input, data-transmission and data-reception volumes, and operational periods, location.

* * * * *